United States Patent [19]

Culley

[11] Patent Number: 5,165,037
[45] Date of Patent: Nov. 17, 1992

[54] SYSTEM FOR CONTROLLING THE TRANSFERRING OF DIFFERENT WIDTHS OF DATA USING TWO DIFFERENT SETS OF ADDRESS CONTROL SIGNALS

[75] Inventor: Paul R. Culley, Cypress, Tex.

[73] Assignee: Compaq Computer Corporation, Houston, Tex.

[21] Appl. No.: 378,580

[22] Filed: Jul. 10, 1989

Related U.S. Application Data

[63] Continuation-in-part of Ser. No. 243,327, Sep. 9, 1988, Pat. No. 5,109,332.

[51] Int. Cl.⁵ ............................................. G06F 13/00
[52] U.S. Cl. .................................. 395/800; 364/242.5; 364/260.2; 364/239.9; 364/240.3; 364/DIG. 1; 395/325
[58] Field of Search ... 364/200 MS File, 900 MS File; 395/200, 500, 800, 325

[56] References Cited

U.S. PATENT DOCUMENTS

| 4,417,303 | 11/1983 | Korowitz et al. | 364/200 |
| 4,667,305 | 5/1987 | Dill et al. | 364/900 |
| 4,831,514 | 5/1989 | Turlakov et al. | 364/200 |
| 4,845,611 | 7/1989 | Turlakov et al. | 364/200 |

FOREIGN PATENT DOCUMENTS 2171230 8/1986 United Kingdom .

OTHER PUBLICATIONS

IBM Personal Computer AT Technical Reference Manual, 1985, pp. 1-24 to 1-38.
IBM RT PC Hardware Technical Reference Manual, vol. I, Second Edition, Sep. 1986, pp. 6-1 to 6-62.
IEEE P1196 Specification, Draft 2.0 NuBus, Dec. 15, 1986, pp. 1-60.
IBM Personal System/2 Model 80 Technical Reference, First Edition, Apr. 1987, pp. 2-1 to 2-28 and 2-75 to 2-113.
EISA Press Release, Sep. 13, 1988.
The Great Divide—EISA vs. MicroChannel, PC Magazine, Dec. 27, 1988, pp. 165-186.
H. Jessup, PCET 32-Bit Bus Specification, PCET Bus Development Committee, Jun. 9, 1986.
M. Vano, Personal Computer Extended Technology Bus Committee Alternate Bus Master Data Multiplexing Draft Subcommittee Report, Jun. 14, 1986.
M. Vano, Ambiguities in the IBM PC/RT and PC/AT Documentation (Re: Alternate Bus Masters), Jun. 15, 1986.
D. McCartney, P. Groepler, 32 Bit 68020's Power, Electronic Design, Jan. 1985, pp. 335-342.

*Primary Examiner*—Thomas C. Lee
*Assistant Examiner*—Ayni Mohamed
*Attorney, Agent, or Firm*—Pravel, Gambrell, Hewitt, Kimball & Krieger

[57] ABSTRACT

A computer system which utilizes two different sets of address control and state information signals for transferring information of the same or different widths is disclosed. The use of two sets of signals allows master units to utilize only one set and a system board determines when the second set of signals must be used to complete the transfer and controls the second set of signals as necessary. The system board provides the necessary information routing and latching to properly transfer the information.

27 Claims, 12 Drawing Sheets

SYSTEM BOARD

SYSTEM FOR CONTROLLING THE TRANSFERRING OF DIFFERENT WIDTHS OF DATA USING TWO DIFFERENT SETS OF ADDRESS CONTROL SIGNALS

This is a continuation-in-part of copending application Ser. No. 243,327, filed Sep. 9, 1988 now U.S. Pat. No. 5,109,332

BACKGROUND OF THE INVENTION

1. Field of the Invention

The present invention relates to interface standards used within computer systems, and more particularly to interfaces or busses handling multiple word sizes and having the capability of having multiple bus controllers.

2. Description of the Prior Art

Microprocessors and the personal computers which utilize them have been becoming more powerful over the past few years. Currently available personal computers have capabilities easily exceeding the mainframe computers of twenty to thirty years ago and approaching the capabilities of minicomputers currently manufactured. Microprocessors having word sizes of 32 bits wide are now available, whereas in the past eight bits was conventional and sixteen bits was common.

Personal computer systems have developed over the years and new uses are being discovered daily. The uses are varied and, as a result, have different requirements for the various subsystems forming a complete computer system. Because of production volume requirements and the reduced costs as volumes increase, it is desirable that as many common features as possible are combined into high volume units. This has happened in the personal computer area by developing a basic system unit which generally contains a power supply, provisions for physically mounting various mass storage devices and a system board, which in turn incorporates a microprocessor, microprocessor related circuitry, connectors for receiving circuit boards containing other subsystems, circuitry related to interfacing the circuit boards to the microprocessor, and memory. The use of connectors and interchangeable circuit boards allows subsystems of the desired capability for each computer system to be easily incorporated into the computer system.

The use of interchangeable circuit boards necessitated the development of an interface or bus standard so that the subsystems could be easily designed and problems would not result from incompatible decisions by the system unit designers and the interchangeable circuit board designers.

The use of interchangeable circuit boards and an interface standard, commonly called a bus specification because the various signals are provided to all the connectors over a bus, was incorporated into the original International Business Machines Corporation (IBM) personal computer, the IBM PC. The IBM PC utilized an Intel Corporation 8088 as the microprocessor. The 8088 has an eight bit, or one byte, external data interface but operates on a 16 bit word internally. The 8088 has 20 address lines, which means that it can directly address a maximum of 1 Mbyte of memory. In addition, the memory components available for incorporation in the original IBM PC were relatively slow and expensive as compared to current components. The various subsystems, such as video output units or mass storage units, were not complex and also had relatively low performance levels because of the relative simplicity of the devices available at a reasonable cost at that time.

With these various factors and the component choices made in mind, an interface standard was developed and used in the IBM PC. The standard utilized 20 address lines and eight data lines, had individual lines to indicate input or output (I/O) space or memory space read or write operations, and had limited availability of interrupts and direct memory access (DMA) channels. The complexity of the available components did not require greater flexibility or capabilities of the interface standard to allow the necessary operations to occur. This interface standard was satisfactory for a number of years.

As is inevitable in the computer and electronics industry, capabilities of the various components available increased dramatically. Memory component prices dropped and capacities and speeds increased. Performance rates and capacities of the mass storage subsystems increased, generally by the incorporation of fixed disk units for the previous floppy disk units. The video processor technology improved so that high resolution color systems were reasonably affordable. These developments all pushed the capabilities of the existing IBM PC interface standard so that the numerous limitations in the interface standard became a problem. With the introduction by Intel Corporation of the 80286 microprocessor, IBM developed a new, more powerful personal computer called the AT. The 80286 has a 16 bit data path and 24 address lines so that it can directly address 16 Mbytes of memory. In addition, the 80286 has an increased speed of operation and can easily perform many operations which were previously very complicated with the 8088.

It was desired that the existing subsystem circuit boards be capable of being used in the new AT, so the interface standard used in the PC was utilized and extended. A new interface standard was developed, which has become known as the Industry Standard Architecture (ISA). A second connector for each location was added to contain additional lines for the signals used in the extension. These lines included additional address and data lines to allow the use of the 24 bit addressing capability and 16 bit data transfers, additional interrupt and direct memory access lines to indicate whether the subsystem circuit board was capable of using the extended features. While the address values are presented by the 80286 microprocessor relatively early in an operation cycle, the PC interface standard could not utilize the initial portions of the address availability because of different timing standards for the 8088 around which the PC interface standard was designed. This limited the speed at which operations could occur because they were now limited to the interface standard memory timing specifications and could not operate at the rates available with the 80286. Therefore the newly added address lines included address signals previously available, but the newly added signals were available at an earlier time in a cycle. This change in address signal timing allowed operations which utilized the extended portions of the architecture to operate faster.

With the higher performance components available, it became possible to have a master unit other than the system microprocessor or direct memory access controller operating the bus. However, because of the need to cooperate with circuit boards which operated under the new sixteen bit standard or the old eight bit standard, each master unit was required to understand and operate with all the possible combinations of circuit boards. This increased the complexity of the master unit and resulted in a duplication of components, because the master unit had to incorporate many of the functions and features already performed by the logic and circuitry on the system board and on other master units. Additionally, the master unit was required to utilize the direct memory access controller to gain control of the bus, limiting prioritizing and the number of master units possible in a given computer system.

The capability of components continued to increase. Memory speeds and sizes increased, mass storage unit speeds and sizes increased, video unit resolutions increased and Intel Corporation introduced the 80386 microprocessor. The increased capabilities of the components created a desire for more use of master units, but the performance of a master unit was limited by the ISA specification and capabilities. The 80386 could not be fully utilized because it offered the capability to directly address 4 Gbytes of memory using 32 bits of address and could perform 32 bit wide data transfers, while the ISA standard allowed only 16 bits of data and 24 bits of address.

An extension similar to that performed in developing the ISA could be done to fully utilize the 80386's capabilities but this extension would have certain disadvantages. If it was desired to use any of the previously existing subsystem circuit boards, to prevent the need to replace at great cost the boards, the complexity of the interface standard increased greatly, so that the amount of redundant circuitry in a master unit would become oppressive, both in terms of component cost and space requirement. Additionally, a similar extension would not increase mastering capabilities significantly, but would still limit their operation because of difficulties in obtaining and controlling the bus which existed in the ISA. Further, the extension should allow the use of several different data widths so that a choice can be made, for example with 16 bit devices, to use one or the other protocol as desired so completely new designs would not be required. Then 16 bit master units would not have to operate using the more difficult mastering protocol of the ISA standard.

SUMMARY OF THE INVENTION

A computer system incorporating the present invention can utilize the capabilities of the present computer components, can utilize master units which do not have redundant circuitry and can utilize the vast majority of subsystem circuit boards designed to operate according to the IBM PC standard and to the ISA standard. A computer system incorporating the present invention provides the increased address and data lines necessary to allow use of the full memory address range and 32 bit word width of the Intel Corporation 80386, as well as the 24 bit address and 16 bit word width of the 80286 and 80186. New state indication and address control signals are provided. The new signals are for use by units capable of operating on 32 or 16 bit wide data and 32 bit address buses and by new 16 or 32 bit wide master units. The state indication and address control signals of the ISA standard are still utilized for operation with circuit boards that do not support the new extended architecture and specifications.

By providing two sets of state indication and memory control signals and transferring control of some of those signals, it is now possible to design master units which are not required to understand and operate with all the possible interface alternatives. Instead, the master unit need only utilize the extended state indication and address control signals and the appropriate address and data signals. According to this invention, the system board monitors the bus operations of a master unit and determines when the requested operation cannot be performed by a circuit board capable of responding using the same or wider data path and the extended features. When this condition occurs, the master unit understands that the requested operation is not ready and the master unit releases the data lines and certain addressing and control lines for control by the system board. The system board proceeds to perform the desired operation utilizing the necessary eight or sixteen bit protocol based on ISA standard signals or the sixteen bit extended protocol. The system board latches the data for master unit write operations and performs the necessary cycles and data transfers to complete the operation. For read operations the system board performs the necessary cycles and assembles the data in the proper locations for presentation to the master unit when the operation completes. When the necessary cycles are completed, the system board indicates to the master unit that the requested operation is ready and a proper width extended device is responding. The cycle is completed using the new extended protocol.

Additionally, translation capabilities are provided so that 16 bit ISA master units can work with circuit boards utilizing the extended protocol, allowing these masters to be utilized and not requiring their replacement with extended protocol masters.

In this manner the master unit need not be capable of independently operating with ISA standard-only circuit boards or narrower extended protocol circuit boards, but uses the system board to provide the capability to utilize ISA standard-only circuit boards and narrower extended protocol circuit boards. Thus large amounts of circuitry need not be on each master unit when using the present invention, thereby saving duplication of circuitry on each master unit with the resulting cost and circuit board area savings.

BRIEF DESCRIPTION OF THE DRAWINGS

A better understanding of the invention can be had when the following detailed description of the preferred embodiment is considered in conjunction with the following drawings, in which.

DETAILED DESCRIPTION OF THE PREFERRED EMBODIMENT

The following disclosures are hereby incorporated by reference:

U.S. application Ser. No. 243,480, entitled "Computer System with High Speed Data Transfer Capabilities" by Paul R. Culley, filed on Sep. 9, 1988, issued as U.S. Pat. No. 5,058,005 on Oct. 15, 1991;

U.S. application Ser. No. 378,579, entitled "Computer System With High Speed Data Transfer Capabilities" by Paul R. Culley, filed on Jul. 10, 1989;

U.S. application Ser. No. 242,728, entitled "Extended Input/Output Circuit Board Addressing System" by Paul R. Culley and Montgomery McGraw, filed on Sep. 9, 1988, issued as U.S. Pat. No. 4,999,805 on Mar. 12, 1991;

U.S. application Ser. No. 242,954, entitled "Programmable Interrupt Controller" by Paul R. Culley, and Montgomery McGraw, Karl N. Walker and Lazaro D. Perez, filed on Sep. 9, 1988, now abandoned and continued as U.S. application Ser. No. 691,169, now U.S. Pat. No. 5,101,497 filed on Apr. 24, 1991;

U.S. application Ser. No. 242,734, entitled "Method and Apparatus for Configuration of Computer System and Circuit Boards" by Curtis R. Jones, Jr., Robert S. Gready, Roberta A. Walton, Scott C. Farrand, Daryl George and Michael Griffin, filed on Sep. 9, 1988, now abandoned and continued as U.S. application Ser. No. 746,000, filed Aug. 9, 1991; and U.S. application Ser. No. 293,315, entitled "Method and Apparatus for Configuration of Computer System and Circuit Boards", by Curtis R. Jones, Jr., Robert S. Gready, Roberta A. Walton, Scott C. Farrand, Daryl George and Michael Griffin, filed on Jan. 4, 1989, all of which are assigned to the assignee of this invention.

Figure 1:
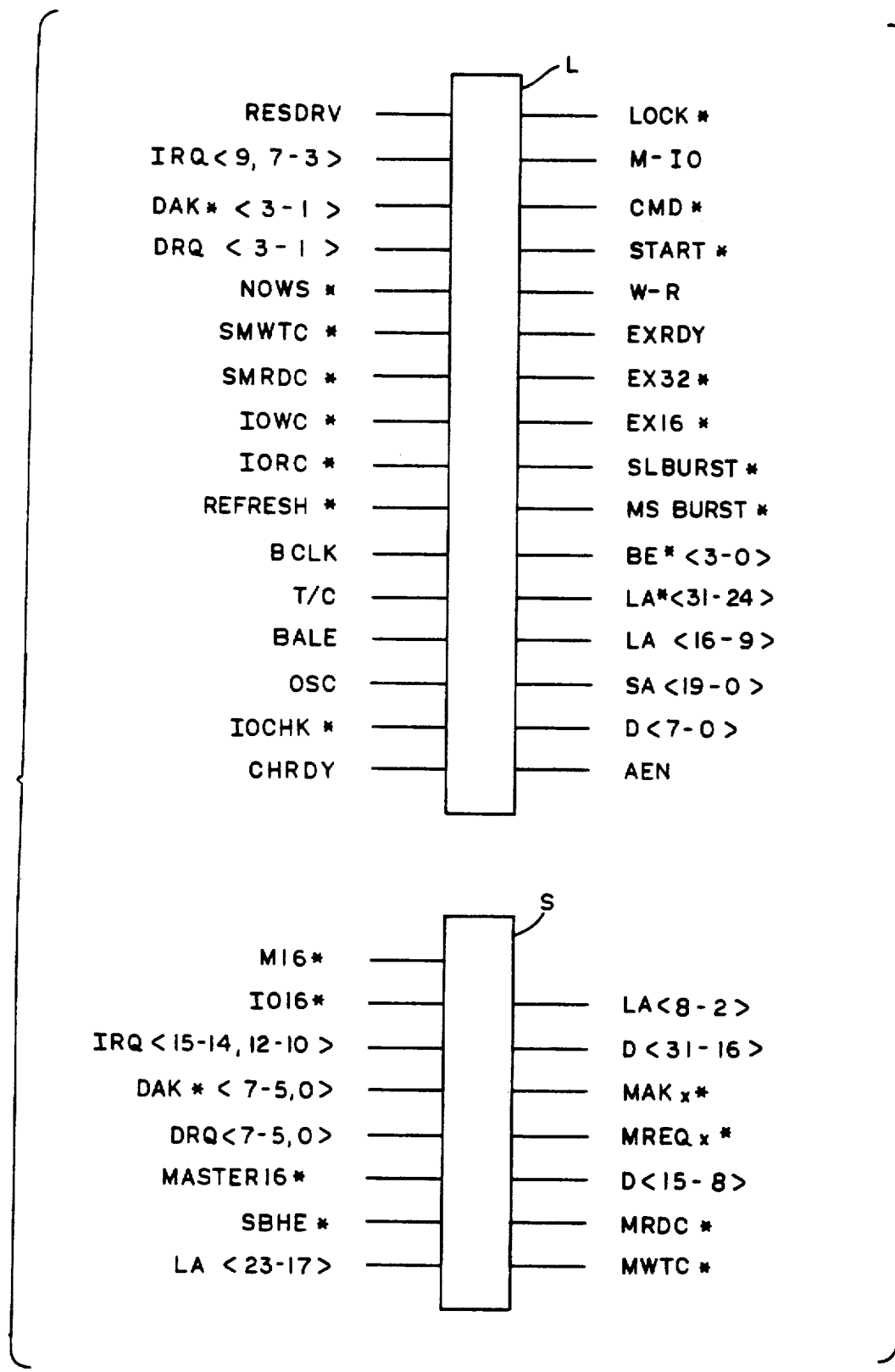
FIG. 1 is a diagram illustrating the connectors and signals of a computer system incorporating the present invention.

A computer system incorporating the present invention has a system board which has a number of locations or slots for inclusion of interchangeable circuit boards. Each location preferably has two connectors, a long connector L (FIG. 1) corresponding to the 8 bit IBM PC standard connector and including additional signals and a short connector S, corresponding to the sixteen bit connector and including additional signals. Each connector L or S has included a series of lines which are designated for carrying various signals, which are the logical representation of the desired function and generally have the same identification mnemonic. The signals associated with the connectors L and S are shown with the respective connectors in FIG. 1. The various power and ground lines included in each connector are not shown for reasons of clarity. The various lines are connected to each connector L and S at each location, so that a bus results, unless otherwise noted. This is the bus which is generally referred to in this specification. In general when referring to signals in this description, an asterisk (*) after a signal mnemonic indicates that it is logically true when a low voltage level is present and angle brackets with included numbers after a signal mnemonic are used to indicate single or multiple bit positions in a wider logical signal, such as the data or address fields.

Various mnemonics are assigned to the signals and each of the signals has a given logical meaning. The logical meanings of various signals illustrated in FIG. 1 will be explained at this time. The SA<19-0> signals are the 20 bits of address information originally provided in the IMB PC. Generally, the new addressing information is enabled onto these lines when the valid address signal BALE, for address latch enable, is high. The addressing information present on the SA lines is latched by the system board when the BALE signal goes from a high to a low state. These SA address lines are provided in addition to the address lines LA*<31-24>, LA<23-17>, LA<16-9>, and LA<8-2> which are for use with the early or pipelined address values presented by the system microprocessor if it is an 80286 or 80386. The addressing information is available on the LA lines for a period of time before the information is available on the SA lines, thereby allowing faster operation of the various circuit boards which utilize these lines and signals. While the top 8 LA signals are inverted or low true, in the remaining portions of this specification they will be indicated as high true for ease of explanation, the proper signal level being understood. Four additional addressing signals, which are referred to as the byte enable signals BE*<3-0> are also present. These signals are provided by the 80386 to indicate which byte or bytes of the 32 bit double-word is desired and are used to complete the address value and must be fully utilized by any extended standard devices, either master or slave.

The 32 data lines present in the computer system are the signals or lines referred to as D<7-0> on the large connector L, D<15-8> available on the small connector S, and D<31-16> present on the small connector S.

Numerous interrupt request lines were present on the connectors in an ISA standard system and are retained on the large and small connectors L and S to allow the various circuit boards to present interrupts to the system board when necessary. These interrupt signals are identified as IRQ<9,7-3>, and IRQ<15,14,12-10> on the connectors L and S, respectively.

The computer system can perform direct memory access (DMA) functions wherein information is transferred directly from an I/O space location contained on a circuit board or system board to a memory space location contained on another circuit board or on the system board. Lines must be available to allow signals to indicate when information is available for transfer, so that control of the bus can be transferred to the DMA controller. Additionally, lines must be available to allow a signal to indicate when a DMA request is acknowledged. The DMA request signals DRQ<1-3> and DRQ<0> and DRQ<7-5> are supplied on the similarly identified lines to present the DMA requests. The acknowledgements of the various requests, which are granted to indicate that the specific requesting device may operate, are identified as the DAK*<1-3>, DAK*<0>, and DAK*<7-5> signals and lines. A T/C line is provided on the large connector L to allow indication that the terminal count or last count of a DMA operation has been reached.

In the ISA standard, a master unit had to issue a DMA request to obtain control of the bus. The master unit then awaited for the acknowledgment signal, at which time the master unit took the MASTER* signal low, indicating that a master unit was controlling the bus. The presence of this signal disabled any devices or circuitry which would otherwise normally be presenting address and control information on the bus, such as the DMA controller. Because this circuitry was cumbersome and did not allow sufficient prioritizing and control scheduling, master unit request and master unit request acknowledgment signals are provided in the small connector S. These signals are referred to as MREQx* and MAKx*, where the "x" refers to the specific location or slot of the connector. The addition of these signals provides a manner of changing and adding flexibility to the prioritization of master unit requests and allows the DMA channels to be reserved for more conventional direct memory access type operations. The MASTER* signal has been retained, but has been renamed MASTER16* and has additional functions relating to indicating the data width of a master unit utilizing the extended standard Because of the costs of various types of memory, personal computer systems generally utilize dynamic random access memory for the main memory systems. Dynamic random access memory (DRAM) is generally available at a significantly lower cost per bit than static random access memory and therefore has allowed the development of the personal computers having very large amounts of memory. However, the DRAM's electrical charge must be periodically refreshed or they will lose the stored information. To facilitate this refreshing operation, a REFRESH* signal is present on the large connector L to indicate that the refresh operation is occurring. The presence of this signal indicates that the various address lines and control signals are operating in the refresh mode to allow the refreshing of the entire system memory at one time.

A reset signal is provided on the large connector L and is referred to as RESDRV. The presence of this signal allows the various circuit boards to be reset during power-up operations.

Because computers generally operate in a synchronized relationship where events must occur in relationship to a controlling signal, a synchronizing clock is generally necessary and is provided in this case by the BCLK signal provided on the large connector L. For purposes of this description, the BCLK signal has a frequency between 6.0 MHz and 8.333 MHz, with a nominal value of 8.0 MHz, and has a nominal duty cycle of 50%. This synchronizing signal is different than the OSC signal, which is provided for timing applications and has a frequency of 14.31818 MHz and a duty cycle of approximately 50%. The OSC signal is not synchronized, but is provided for general clocking features, whereas the BCLK signal is synchronized to the microprocessor's system clock and is used as the reference for interface signal timing requirements.

A signal referred to as the AEN signal is provided on the large connector L to indicate to the circuit boards that the DMA controller is in control of the bus. One of the functions of this signal is to indicate to an I/O device that it must not respond to the other signals being presented on the bus However, the AEN signal is not used by a circuit board when that board must respond to a DMA operation. This DMA response need is determined by coordinating the DMA acknowledged signal DAK* with the AEN signal, so that if the circuit board's DAK* signal is high, indicating that it is not being accessed, then when the AEN signal is high any addressing information is not utilized.

An IOCHK* line is provided on the large connector L to signal the system about parity or other serious errors which have occurred on the circuit boards plugged into the various connectors. This signal is used when an uncorrectable error occurs so that further processing is not performed on any erroneous data.

On the large connector L a new line referred to as LOCK* is provided for interaction with circuit boards which contain local memory and local processing capability. The information stored in the local memory may be changed by the local processor at the same time that the local memory information is being requested by the device controlling the bus, thus resulting in the bus device receiving incorrect information. When the LOCK* signal is asserted low, the local processing devices cannot access the local memory, to prevent data values from changing between accesses by the device controlling the bus.

The remaining signals provided on the two connectors L and S are state indication and address control signals. The signals are used to indicate the operating state of the bus or the need for accessing to the various I/O or memory spaces. In general, the state indication and address control signals of the connectors L and S relating to conventional ISA operation are such that individual signals are presented to indicate whether a memory or I/O space operation read or write is being performed. For example, the MRDC* or SMRDC* signals are made active during a memory read cycle. The SMRDC* signal is enabled only when a memory read operation within the first 1 Mbyte of memory is occurring. In a similar manner, the MWTC* and SMWTC* signals are used to indicate a memory write operation, while the IORC* and IOWC* signals are used to indicate I/O space read and write operations, respectively. Any further references to the MRDC* and MWTC* signals will be assumed to include like operations to the SMRDC* and SMWTC* signals if the presented address is within the first 1 Mbyte of memory. Because the various I/O devices and memory devices have differing speeds, it is necessary for the bus controller to know whether a particular device can respond faster than a given normal rate or slower than a given normal rate. For this reason, a signal referred to as NOWS* is provided to indicate that no further wait states are necessary when addressing that particular device, and a CHRDY signal is provided to indicate that the particular device is not ready at that time.

A signal referred to as SBHE* is provided on the small connector S to indicate that the D<15-8> lines will be used in the data transfer. Two additional address control signals, referred to as M16* and IO16*, are provided on the small connector S to indicate that an ISA standard 16 bit device will respond to the information request or cycle present on the bus. The M16* signal is developed from the use of the LA address signals and thus is presented early in a given cycle. The presence of either the IO16* or M16* signal indicates both that the device will respond using a 16 bit data path and that the device can respond to a shorter standard cycle time than a device which can provide data only 8 bits at a time. This shorter standard cycle time is possible because of the various improvements in component speeds which occurred between the development of the IBM PC standard and the ISA standard. These state indication and address control signals represent the state indication and address control signals necessary for operation under the ISA standard and for operation with 8 and 16 bit wide ISA standard data. These signals are utilized by existing 8 and 16 bit circuit boards designed for operation with the IBM PC or ISA standards.

A wholly separate set of state indication and address control signals is provided for the extended standard. The START* and CMD* signals are provided for timing control in an extended cycle. The START* signal is asserted after the address has become valid and is generally deactivated after one full BCLK cycle time. The START* signal thus indicates the start of an extended cycle. The rising edge of the START* signal can be used to latch the address if desired. The CMD* signal is asserted low when the START* signal is deactivated and is generally continued at a low state until the end of the cycle, unless data assembly or distribution is necessary. Thus the START* and CMD* signals are basically used to indicate the beginning and end of an extended standard cycle, with various events happening in synchronization with the BCLK signal after the assertion of the START* or CMD* signals. M-IO and W-R signals are used to indicate whether a memory or I/O space cycle is being performed and whether the operation is a read or write operation in that given space. These two signals are used in contrast to the six signals provided in the ISA standard to indicate similar information. The M-IO signal must be used for decoding any cycle to determine if the cycle is to the memory or input/output space. A separate line used to indicate that an extended device or data is not ready is provided on the large connector L and is referred to as the EXRDY line. It is also necessary to know whether the addressed device will respond according to the extended standard using a 16 or 32 bit data path and this is determined by signals presented on the EX32* or EX16* lines.

Two additional signals referred to MSBURST* and SLBURST* are provided on the large connector 32. These signals are used to indicate that a memory burst operation is being requested and may occur, to allow very high throughput for certain operations. The operation of these signals is more fully described in co-pending patent applications entitled "Computer System with High Speed Data Transfer Capabilities" which have been incorporated by reference.

Thus it can be seen that there is a wholly separate set of state indication and address control signals provided for use by devices incorporating the extended standard as herein defined. The advantage of this will be seen as more detail is provided on the operation of these various signals, particularly in regards to their capability to operate with a master unit.

The proceeding is a summary of the various lines and signals which are present on large and small connectors L and S. Operation of the various signals necessary to perform read and write operations by a master unit to various bit width devices will now be explained in detail. The various events which occur will be explained in relation to both rising and falling edges of the BCLK signal as this is the synchronizing signal for the control sequences. For purposes of this description, the computer system's central processing unit, preferably an 80386 microprocessor located on the system board, or the computer system's DMA controller may be considered special master units. In general, equivalents to the signals used by a master unit located on a circuit board for interfacing which are presented on large and small connectors L and S are presented to the central processing unit and the DMA controller, so that while the central processing unit and the DMA controller are not necessarily located on an interchangeable circuit board, they and their related interface circuitry function in a manner similar to such a master unit and thus can be considered a master unit for this description.

Figure 2:
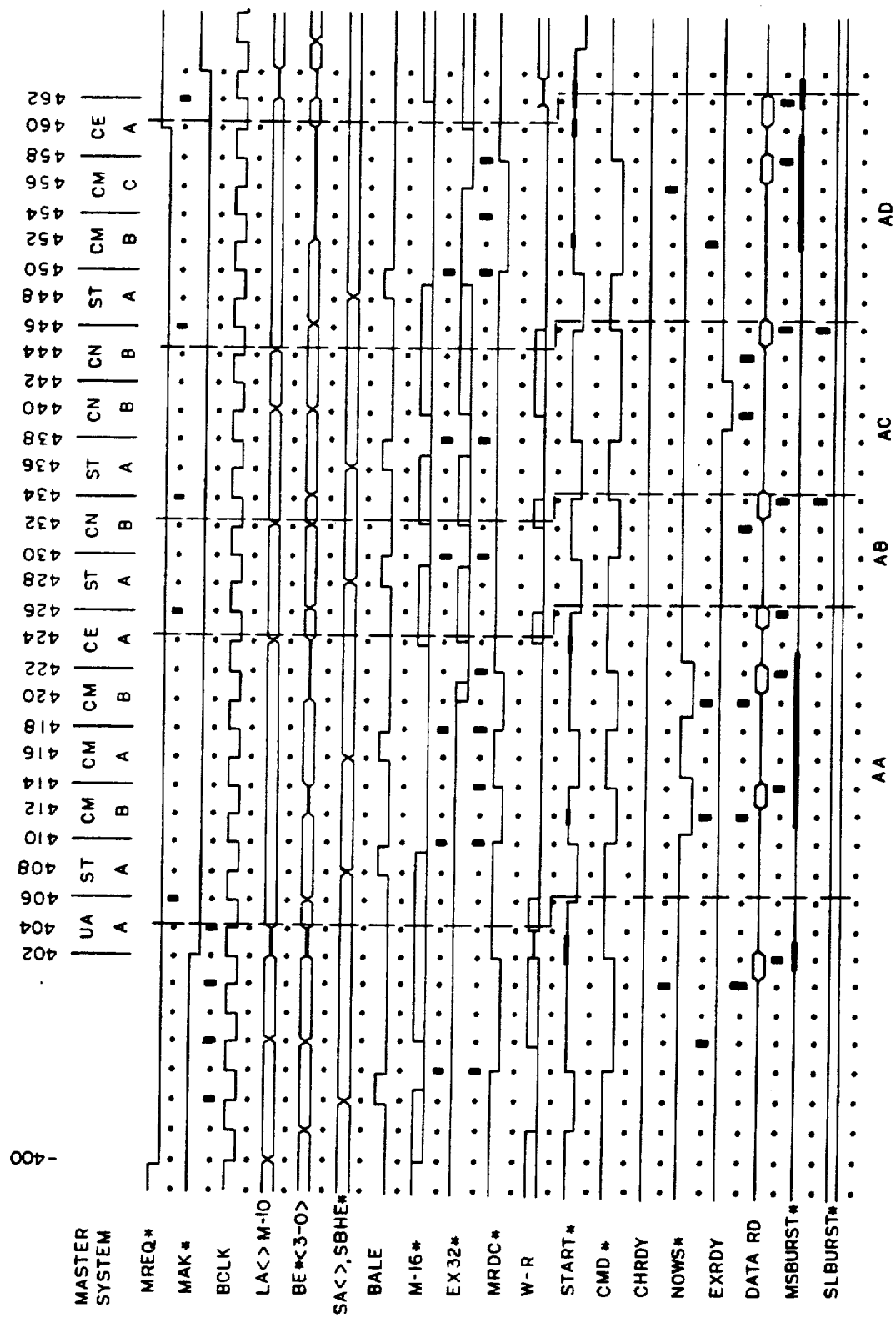
FIG. 2-8 are timing diagrams showing the waveforms of various portions of a computer system incorporating the present invention.

The master unit which desires control of the bus asserts the MREQx* signal at time 400 (FIG. 2). The priority control logic contained on the system board (not shown) then analyzes this master request and places the request in the priority schedule. Control eventually proceeds to the requesting master unit. The master unit receives control when MAKx* signal goes low at time 402. The MAKx* signal is synchronized by the system board so that it goes low on the rising edge of the BCLK signal. After time 402 and before the next BCLK signal edge at time 404 the master unit begins driving the START* signal, with the system board ceasing to drive the START* signal at time 404. While this results in two sources driving the START* signal at the same time, both sources are driving the signal high and this condition is acceptable with conventionally used components.

At time 404, the falling edge of the BCLK signal, the master unit presents the 32 bit address onto the LA<31-2> lines and sets the M-IO signal to the proper level. The master unit may at that time also set the W-R signal to indicate the desired read or write operation as desired and assert the BE*<3-0> signals, but the W-R and BE*<3-0> signals need not be set at this time. At time 406, the BCLK signal goes high. Based on this rising edge, the W-R signal must be asserted, the BE*<3-0> signals are asserted and the START* signal is made active by the master unit, indicating the beginning of an extended standard cycle. The dashed line which appears at times 404 and 406 indicates the beginning of an extended standard cycle. The dashed lines are not straight because address information and certain address control signals appear one-half BCLK signal cycle before the remaining information to allow extra time for address decoding. Time 404 is the beginning of cycle AA, which is a request from a 32 bit master unit to read a given memory location, which in cycle AA is a memory location which exists on a 16 bit ISA circuit board which uses the ISA protocol and cannot respond using the extended protocol At time 408, the next falling edge of the BCLK. signal, the BALE signal is asserted by the system board to indicate to all devices which utilize the ISA standard that an address is present. Because the master unit only presents address information on the LA and BE* lines, the system board transfers the address information to the SA lines as and when appropriate to relieve the master unit of this task, in this case at time 408 when the BALE signal is asserted high.

At the next rising edge of the BCLK signal, which is time 410, the START* command is made inactive by the master unit and the CMD* signal is made active by the system board. The system board drives the CMD* signal at all times. Additionally, the EX32* and M16* signals are interrogated to determine if a circuit board capable of responding on the 32 bit lines or the 16 bit lines is present. The small, heavy vertical marks on the timing diagrams indicate sampling or interrogation times for the signal directly above the mark, while the thickened horizontal lines indicate dual unit driving intervals if the line is at a high or low level or a tri-state, non-driven interval if the line is at an intermediate level. In the example shown in cycle AA, the EX32* signal remains high and the M16* signal goes low, indicating that a 32 bit extended device will not respond, but a 16 bit ISA device will respond on the 16 bit data lines. Because the EX32* signal is high, the system board will have to complete the cycle and assemble the data for presentation to the master unit. Because the EX32* signal is high at this time, the master unit knows that a 32 bit extended device will not respond and that the system board will be performing a data assembly cycle. The master unit thus also knows that it is to ignore any states on the EXRDY line until the next cycle, the EX32* signal being used to indicate when the cycle is completing. The master unit acknowledges this procedure by floating the data lines if a write operation is occurring, so that the system board can utilize the data lines as necessary to properly communicate with the circuit boards which will respond. At time 410, the BALE signal is made inactive or low, causing the system board to latch address information which appears on the SA address lines. Additionally, because the EX32* and EX16* signals are high, indicating that an extended device will not be responding, the MRDC* line (and the SMRDC* line if appropriate) is brought low at this time to indicate that a memory read operation is occurring. This begins a read cycle according to the ISA standard.

At time 412, the master unit passes control of the START*, BE*<3-0> and MSBURST* signals to the system board for use in the data assembly process. Control returns to the master unit at the end of the cycle. Before the falling edge of the BCLK signal which occurs at time 414, the NOWS* signal must be made low by the responding or slave device to indicate that this is a 16 bit device which is capable of responding in less than the 1 wait state which is built into the standard cycle times for a 16 bit device in the ISA standard specification. In the example in cycle AA, the NOWS* signal does go low before time 412. Sometime after time 412 the data coming from the device which is responding will begin correctly appearing on the data lines, in this case the D<15-8> lines on the small connector S and the D<7-0> lines on the large connector L. The information must be available and stable prior to the next edge of the BCLK signal at the time 414. Because this has been determined to be a no wait state cycle, at the rising of the BCLK signal at time 414, the MRDC* signal (and SMRDC* signal if appropriate) is made high by the system board indicating the end of a memory read cycle according to the ISA standard and the data which is present on the data lines is forwarded to a latch or other storage device which exists on the system board. The data is automatically routed from the data lines on which it appears to a latch whose outputs are connected to the proper byte or word for presentation on the full 32 bit data lines to respond to the request which is still pending on the master unit, because the master unit is waiting for the EX32* signal to go low, indicating the device is ready. This routing is accomplished by means of analyzing the actual address which has been asserted and the word width which is being responded to by the responding device and requesting data width and locations. Additionally at time 414, new BE*<3-0> signal values are asserted by the system board to reflect the next address of data to be obtained. Only the BE*<3-0> signals need to change because the remaining address lines do not change, the operations being preferably defined for 32 bit transfers. Assertion at this time allows the BE*<3-0> to SA<1-0> logic present on the system board time to operate.

Figure 12:
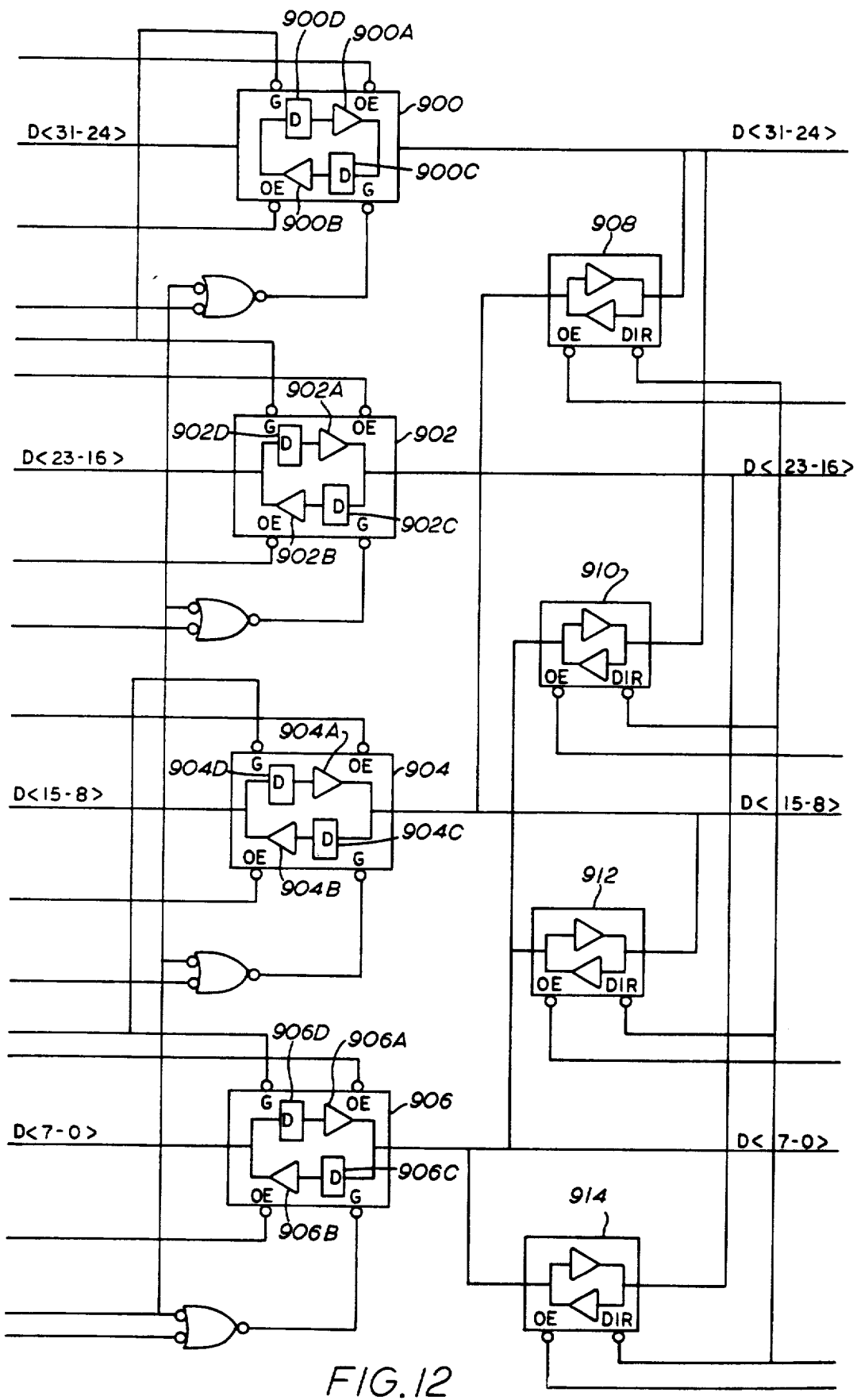
FIG. 12 is a block diagram of data routing and latching circuitry of a computer system incorporating the present invention.

FIG. 12 illustrates a series of transceivers and latched transceivers connected and controllable to perform this data routing and latching. The enabling, latching and direction control circuitry is not shown for reasons of clarity. Four 8 bit latched transceivers 900, 902, 904 and 906 are used to provide the necessary temporary data storage function during the assembly or forwarding process. Each latched transceiver 900, 902, 904 and 906 contains two buffers and two latches, referred to by the suffix letters A, B, C and D respectively. During a 32 bit write operation, the data presented on the D<31-0> lines is transferred to the latches 900D, 902D, 904D and 906D. The latches are preferably transparent latches so the data present on the inputs is immediately transferred to the outputs when enabled. The outputs of the latches 900D, 902D, 904D and 906D are then passed to the buffers 902A, 904A and 906A to pass the data back to the D<31-0> lines. If no data transfer or assembly is required, the latched transceivers 900, 902, 904 and 906 are actually disabled. However, when shifting or assembly is necessary, the latched transceivers 900, 902, 904 and 906 are active. During shifting and assembly operations a series of 8 bit transceivers 908, 910, 912 and 914 are utilized. For example, when the data must be provided from a 32 bit master to an 8 bit slave, the data is latched into the latches 900D, 902D, 904D and 906D. In the first cycle the buffer 906A is activated to transfer the low byte of information. In the next cycle the buffer 904A is activated and the transceiver 912 is controlled to pass the data from the D<15-8> lines to the D<7-0> lines for storage by the slave. In the third cycle the buffer 902A is activated and the transceiver 914 is used to shift the data from the D<23-16> lines to the D<7-0> lines. In the fourth and final cycle the buffer 900A passes the data from the latch 900D to the D<31-24> lines. The data passes through the transceiver 910 to the D<7-0> lines.

If a 16 bit slave is responding, in the first cycle the buffers 904A and 906A enable the data directly onto the D<15-0> lines. In the second cycle the transceivers 908 and 914 are used to shift the data from the latches 900D and 902D and the buffers 900A and 902A to the D<15-0> lines.

During read operations the data effectively flows in the opposite direction in the circuitry of FIG. 12. The data is latched by the latches 900C, 902C, 904C and 906C and enabled onto the D<31-0> lines after assembly is complete by the buffers 900B, 902B, 904B and 906B. The data is shifted from the D<7-0> lines or the D<15-0> lines as appropriate using the transceivers 908, 910, 912 and 914 based on the slave data width and the cycle being performed, as well as the requested data width and lanes.

In the case of cycle AA, a 16 bit device has responded, so the data is properly routed to the lower two byte latches 904C and 906C of the 32 bit double-word which will be provided to the master unit.

The next edge of the BCLK signal is a falling edge which occurs at time 416. At this time the BALE signal is made high to indicate that a valid address is appearing on the SA lines. The SA address is presented on the lines by the system board. The system board automatically transfers the address signals LA<19-2> to the address signals SA<19-2> in all cycles. In the initial ISA standard cycle which occurred at time beginning at time 408, the lower two bits of the full address were developed from the BE*<3-0> signals presented on the 32 bit connector 32. These signals were properly decoded to provide the proper two bits necessary for the lowest two bits of the address, which were then presented on the SA<1-0> lines at time 408. At time 416 when the BALE signal goes high, the lower two bits of the SA address signals are again determined from the BE*<3-0> signals which have been changed by the system board. This will be more clearly described during the system board state machines operation description.

At time 418, the BCLK signal undergoes a rising edge and the BALE signal is made inactive or low, with the START* signal being set high and the CMD* signal being set low. Also at this time, the MRDC* signal is again made low to indicate that a read operation is occurring. At this time it is also determined whether a 16 bit ISA standard device will be responding, based on the state of the M16* signal. In cycle AA, a 16 bit ISA standard device will be responding as the M16* signal is in the low or active state.

The NOWS* signal is made low before the falling edge of the BCLK signal which occurs at time 420. Therefore, the system board can determine that this is a no wait state operation and properly move through the state machine to commence completion of the read operation. At any time after time 420 and before the next rising edge of the BCLK signal, it is noted that the EX32* signal is made low by the system board to indicate that an extended cycle is concluding. The system board releases the BE*<3-0> lines at time 420 to allow the master unit to drive the lines.

At the next rising edge of the BCLK signal, which occurs at time 422 and is the next edge, the MRDC* signal is made high to indicate that a read operation is completing according to the ISA standard. Additionally, at this time the data which has appeared on the lower 16 data lines is properly routed to the latches 900C and 902C, which will be able to provide the data to the upper 16 bit data lines which are present on the small connector S, because this is the high word read of a 32 bit double-word access. The EX32* signal must be low prior to time 422 to allow the master unit to use timing and control tests, which sample the EX32* signal at this time.

On the next falling edge of the BCLK signal, which occurs at time 424, the master unit has determined that the addressed device is now ready and will be presenting data which is stable at the next rising edge of the BCLK signal, so that the master unit now presents the address information and M-IO signal for the next cycle, which in this case is cycle AB, a 32 bit read operation which will be performed by a 32 bit slave device. This early presentation of the address information allows the system to operate at a slightly higher rate than would be possible if the information was delayed until the data was obtained. The master unit can at this time change the state of the W-R and BE*<3-0> signals if desired. Additionally, control of the START* and MSBURST* lines is returned from the system board to the master unit for the operation of cycle AB.

On the rising edge of the BCLK signal which occurs at time 426, the data has been presented by the system board at time 424 to all 32 data lines which appear on the two connectors L and S is latched or otherwise stored by the master unit to complete the read operation and to complete cycle AA. Additionally, at this time, the START* signal is made low by the master unit to indicate the start of the cycle AB, the CMD* signal is made high by the system board to indicate the completion of a cycle, the BE*<3-0> signals are asserted and W-R signals are asserted, if they have not previously been set at time 424.

Cycle AB is a 32 bit read command to a 32 bit device which will respond with no wait states. The cycle started at times 424 and 426 as indicated. At the falling edge of the BCLK signal which occurs at time 428, the BALE signal is made high by the system board and the SA<19-0> lines are asserted. Prior to the next edge of the BCLK signal, which is a rising edge, the EX32* signal will be made low by the responding device, commonly referred to as the save unit, to indicate that a 32 bit standard device will be responding. The rising edge of the BCLK signal occurs at time 430, at which time the BALE signal is made low. Also, at this time the START* signal is made high and the CMD* signal is made low to begin the transition in the extended cycle. At the next edge of the BCLK signal, which is a falling edge which occurs at time 432, the master unit samples the EXRDY signal to determine if the device is ready. In this case, the device is ready, which allows the master unit to present a new address on the LA address lines and the new states of the M-10 and W-R signals on their lines, therefore beginning a new cycle AC. On the rising edge of the BCLK signal which occurs at time 434, the START* signal is made low to indicate the beginning of a new cycle, the CMD* signal is made high to indicate the end of the cycle, the BE*<3-0> signals are asserted and the data which has been presented by the addressed device is read from the 32 data lines for use by the master unit.

Cycle AC is a 32 bit read operation performed by a 32 bit device. One wait state is inserted because the 32 bit device is not sufficiently fast to respond without the additional wait state. The events which occur on the various signals at times 436 and 438 are similar to those in cycle AB at the same respective edges of the BCLK signals with respect to the beginning of the cycle state. However, in cycle AC, the EXRDY signal is low at the required falling edge of the BCLK signal which occurs at time 440. This indicates to the master unit that the device will not be responding in the normal cycle time and therefore a wait state is going to be performed. The master unit does sample the EXRDY signal in this case because a matching device is responding and so the system board will not be controlling operations. At this time, the master unit can change the address if desired for the next device or location to be addressed and can change the M-IO and W-R signals as will be needed for the next state. This requires the addressed slave unit or responding unit to have latched the addresses and the M-IO and W-R signals prior to this time, which could readily be performed at the falling edge of the BCLK signal at time 440 or on the rising edge of the BCLK signal at time 438, for example based on the falling edge of the BALE signal or the rising edge of the START* signal. The wait state is a full cycle of the BCLK signal, so that at the rising edge of the BCLK signal, at time 442, no changes are made in any of the signals. The EXRDY signal is then raised prior to the next falling edge of the BCLK signal at time 444, so that at time 444 the master unit determines that the device is ready and the cycle completes as in cycle AB. Thus at time 444, a new address is presented to begin cycle AD and at time 446 the presented data is stored and the states of the START* and CMD* signals are changed.

Cycle AD is a 16 bit read request which is responded to by a 16 bit ISA device which will respond in a normal period using the ISA standard. Thus, at the falling edge of the BCLK signal at time 448, the BALE signal is made high and the proper address values are asserted on the SA lines. At time 450, which is a rising edge of the BCLK signal, if it is determined that the EX32* signal is high, it indicates that this 16 bit request will not be performed by a 32 bit device. At time 450, the START* line is made high by the master unit and the CMD* line is made low by the system board to indicate the continuation of the cycle. Also at the rising edge of the BLCK signal at time 450, the BALE signal is made low, the MRDC* signal is made low to indicate that this is a memory read cycle, and the M16* signal is sampled to determine whether this will be a 16 bit or 8 bit operation. In the case of cycle AD, this is a 16 bit operation.

At the falling edge of the BCLK signal at time 452, the master unit stops driving the BE*<3-0> lines and passes control of the START* and MSBURST* signals to the system board.

At the falling edge of the BCLK signal at time 452, the system board determines whether the NOWS* signal has been asserted to indicate that this is a fast 16 bit ISA device. In the case of cycle AD, it is not a fast device and therefore operation proceeds to the rising edge of the BCLK signal at time 454 and to the falling edge of the BCLK signal at time 456. At this point, the EX32* signal is made low by the system board because this is nearing the completion of a 16 bit read, which is all that was requested, and therefore the EX32* signal can be triggered to indicate to the master unit that the requested cycle is completing. At the rising edge of the BCLK signal at time 458, the MRDC* signal is made high to indicate completion of the read cycle. The data which is obtained on the D<15-8> and D<7-0> lines is properly routed and latched for assertion to the proper data lines as requested by the master unit. Additionally, the CMD* signal is made high.

Several things happen at the falling edge of the BCLK signal at time 460 in the illustrated cycle AD. The first thing of interest is that the MREQx* signal is made high. This could be in response to several factors, such as the master unit responding to the removal of the MAKx* signal, which indicates control must be passed to another controller, and beginning to acquiesce and get off the bus or the case where the master is done with its operations for which it needs the bus and therefore no longer needs to control the bus. This raising of the MREQx* signal is the beginning of the transfer from the master unit to the next unit which will control the bus. Therefore at time 460, the master unit can float the address lines and several address control lines, the LA<31-2> lines, the BE*<3-0> lines and the M-IO and W-R lines, so that the next device can freely use these lines, or these operations can be delayed until time 462 as shown. Finally at time 460, the system board commences returning control of the START* and MSBURST* signals to the master unit and the system board presents the data on the proper data lines. On the rising edge of the BCLK signal at time 462, the data which has been presented by the system board on the desired data lines is utilized by the master unit for its requested operation. This ends cycle AD and this master unit's control and use of the bus. This completes the illustrated timing diagram of FIG. 2 for a 32 bit master unit memory read sequence.

Figure 3:
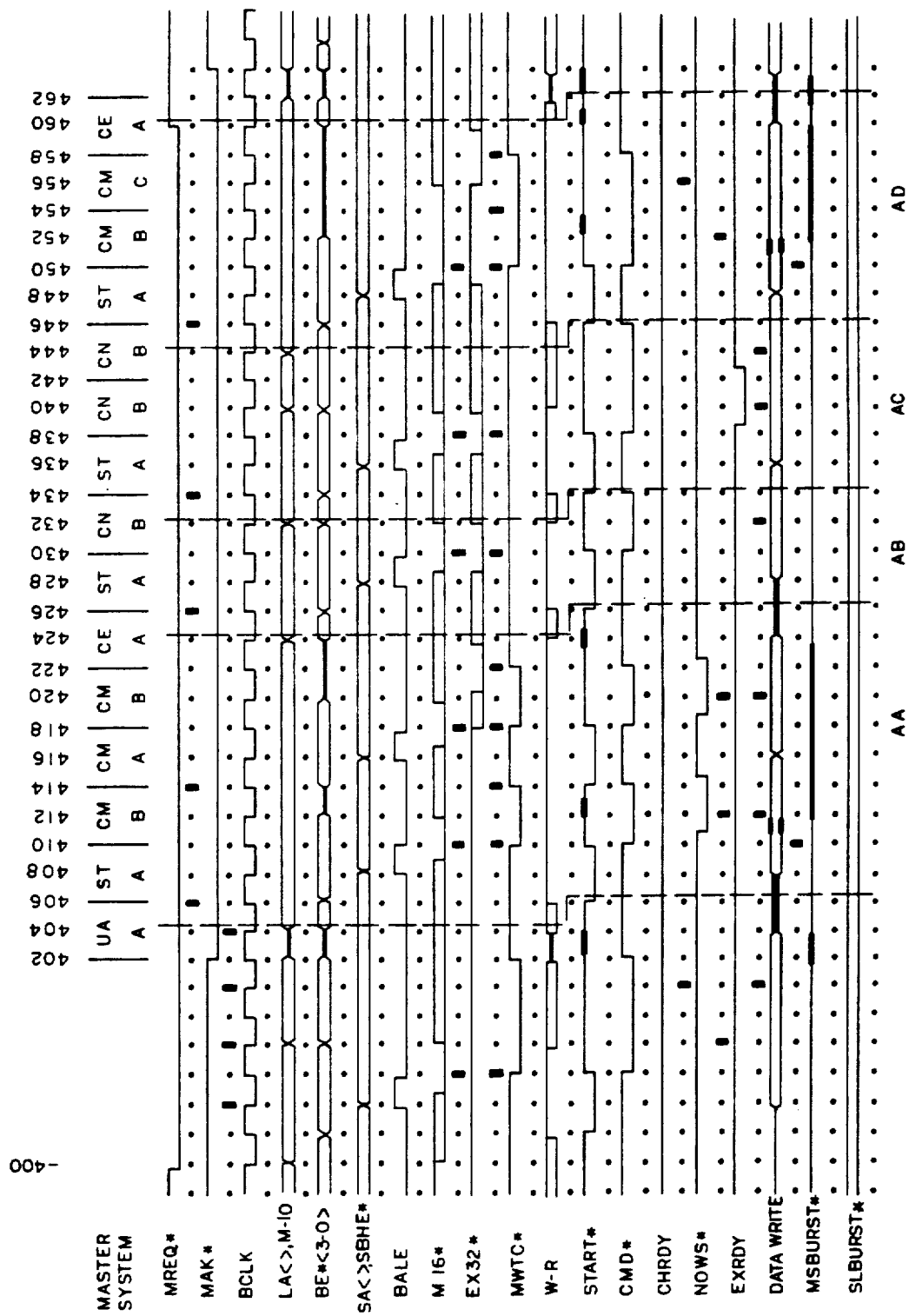

FIG. 3 illustrates the same cycles AA, AB, AC and AD in the case of a 32 bit master unit memory write operation. In general, the same events occur at the same time with the exception of the W-R signal, the MWTC* signal and the data which is available on the data lines. Generally the W-R signal was in a low state during the read operation and is in a high state during a write operation. The MWTC* signal (and SMWTC* signal) appear in the place of a MRDC* signal to indicate to ISA standard devices that the memory write cycle is occurring. The data appears differently on the data lines D<32-16>, D<15-8> and D<7-0> because of the write operation. For example, at time 408, the master unit is presenting the data it wishes to be written onto the data lines. Then at time 410, the system board stores the data in the latches 900D, 902D, 904D and 906D because it is determined that a 32 bit standard device will not be responding to this write operation and therefore the data lines will be floated by the master unit before time 412. The master unit also recognizes that a 32 bit standard device will not be responding and floats the data line before time 412 so that the system board can perform the necessary write operations using the lower data lines as required.

At a time prior to time 412 the system board also begins presenting the lower 16 bits of data onto the data lines D<15-8> and D<7-0> in cycle AA for storage by the device which is responding. The data can be properly routed in this first ISA standard subcycle based on the BE*<3-0> values so that the proper data is present on the D<15-8> and D<7-0> lines should an 8 or 16 bit device respond. The data is presented until time 416, when the next ISA standard write operation commences at the next address. Then at time 424, the information is no longer needed on the data lines because it has been stored by the responding device, so the system board and the master unit float the data lines.

In cycle AB, the master unit begins presenting the data at time 428, which in that cycle corresponds to the beginning of the BALE signal. The data remains on the data lines until one-half cycle of the BCLK signal into cycle AC. This extension of the data on the data lines is provided for continuity with the previous ISA standard and to allow circuit designers more flexibility. A similar extension of the data being written appears in cycle AC where it carries over to time 448.

Cycle AD performs much like cycle AA in that the data is only briefly presented by the master unit on the data lines from time 448 to time 452, at which time it is latched by the system board for proper routing and presentation on the lower 16 bits of the data lines as necessary. In other respects, the write operation is similar to the read operation.

Figure 4:
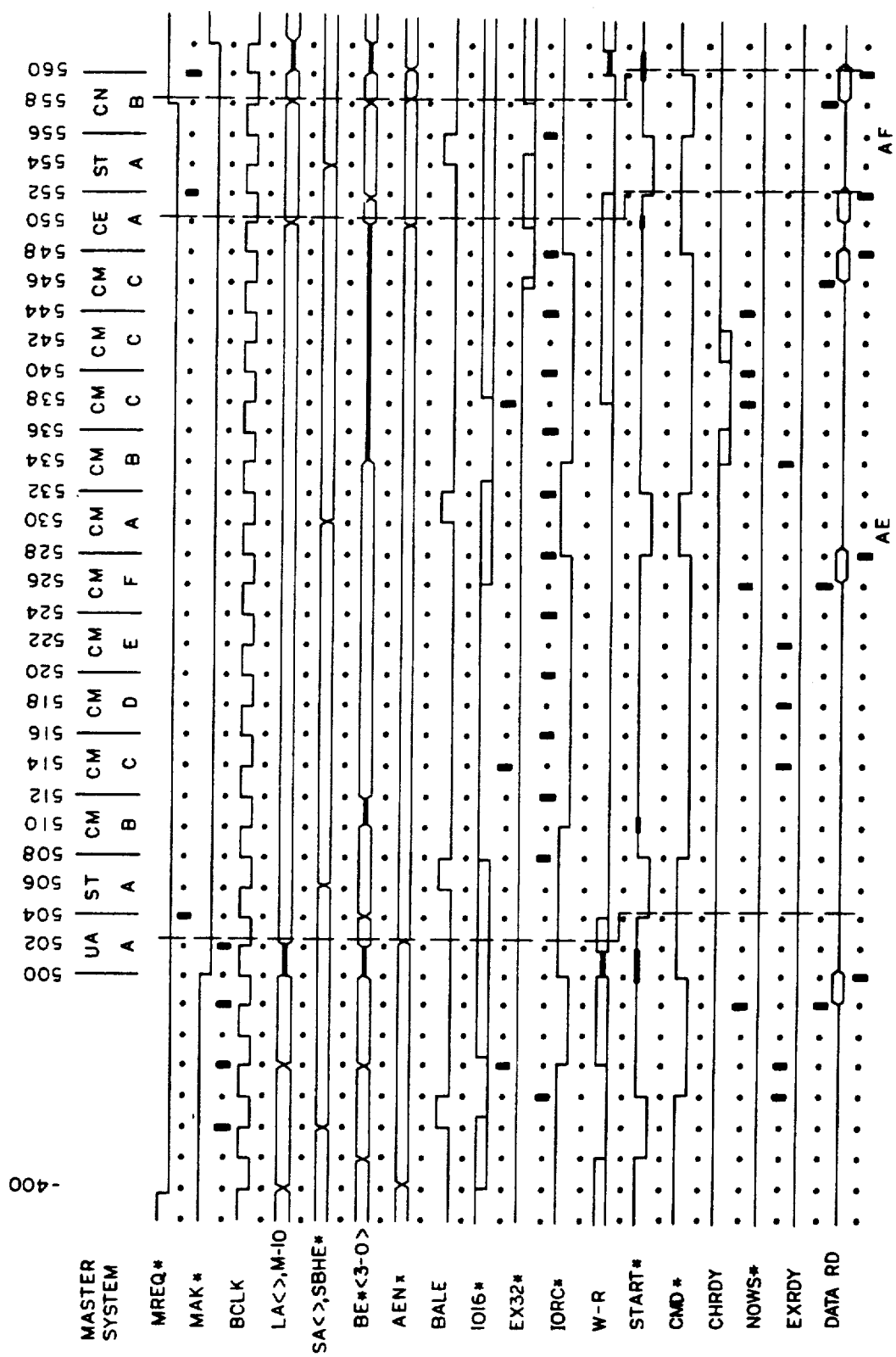
Figure 5:
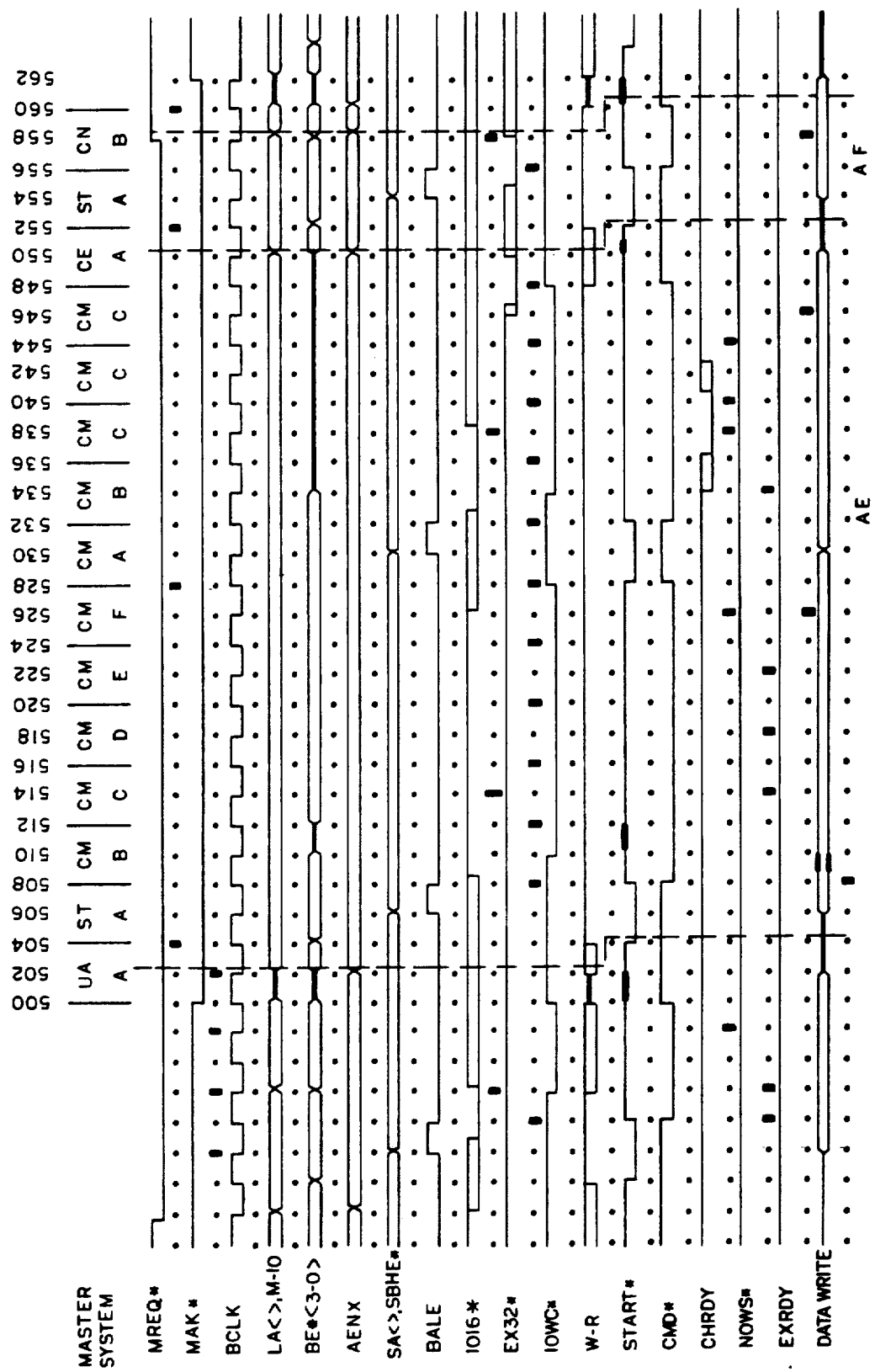

FIGS. 4 and 5 display the timing diagram for 32 bit master unit I/O read and write operations, respectively. Two exemplary cycles AE and AF are shown, the first being a 24 bit operation which is responded to first by an 8 bit device and second by a 16 bit ISA device which needs two wait states. The second cycle AF is a 32 bit operation which is responded to by a 32 bit extended standard device.

The first cycle, cycle AE, commences at time 500, which is when the MAK* signal goes low and the BCLK signal goes high. At time 502, a falling edge of the BCLK signal, the master unit provides the address values to the LA<31-2> lines and the M-IO line is made low to indicate an I/O space operation. The W-R line may be made low at this time, or on the next edge of the BCLK signal. On the rising edge of the BCLK signal which occurs at time 504, the START* signal is driven low by the master unit to indicate the beginning of the extended standard cycle and the BE*<3-0> values are asserted by the master unit. At time 506, the BCLK signal goes low and the BALE signal goes high to indicate to all devices that a valid address is present on the SA lines. The SA address value is developed in the same manner as in the memory operations. At the rising edge of the BCLK signal at time 508, the EX32* signal is sampled to determine whether a 32 bit extended standard device will respond to the request. In cycle AE, a 32 bit extended standard device will not respond and therefore the EX32* signal is high at time 508. This high level indicates to the master unit that it must release the data bus, the START* line and the BE*<3-

0> lines and continue to hold the address lines. This high level of the EX32* signal indicates to the system board that data assembly will be required. Also at this time, the START* signal is made inactive and driven high and the CMD* signal is made active or low to indicate the commencement of the second portion of a extended standard cycle. At time 508 the BALE signal is taken low and the addresses that are presented in the SA address lines are latched by the system board.

At time 510, the falling edge of the BCLK signal, the BE*<3-0> lines are floated, control of the START* signal is passed to the system board and the IORC* signal is driven low to indicate an ISA standard I/O read operation. The BCLK signal undergoes a low to high transition at time 512. At time 512 the master unit begins sampling the EX32* signal at each rising edge of the BCLK signal to determine if the cycle is completing. Also at time 512 the system board drives the next BE*<3-0> value into the bus. It is to be noted that the change in the IORC* signal occurs one-half BCLK signal cycle later than its corresponding counterpart in the memory space operation. This is done to remain consistent with the ISA standard.

Sometime before the next falling edge of the BCLK signal at time 514, the IO16* signal must be asserted low if a 16 bit ISA device will be responding to the request. It is noted that the sampling of the IO16* signal occurs one and one-half BCLK signal cycles later than the M16* signal sampling used in memory space operations. In the case of the illustrated cycle AE, the first request is not responded to by a 16 bit device and therefore the IO16* signal remains high for the entire presentation of the first address. The BCLK signal proceeds through changes at times 516, 518, 520, 522, 524, and 526 during this regular operation of an 8 bit cycle. At each falling edge the system board latches the NOW* signal to determine if the cycle is to end early. At time 526 the system board evaluates the level of the CHRDY signal to see if wait states are needed. In this case, none are necessary. At the rising edge of the BCLK signal which occurs at time 528, the IORC* signal is made high to indicate the end of the 8 bit I/O read operation. At this time the data which is presented on the D<7-0> lines is transferred to the appropriate latch 900C, 902C, 904C or 906C for presentation to the 32 bit master unit at the appropriate location in the 32 bit double word. Additionally at this time the system board raises the CMD* signal and lowers the START* signal to indicate conclusion of one subcycle and commencement of the next subcycle in case an extended standard device is responding and presents the BE*<3-0> signals for the next address. In this way an 8 bit device can use the extended standard, but timings are the same as ISA timings, not extended standard timings.

On the falling edge of the BCLK signal which occurs at time 530, the BALE signal is made high or active to indicate that the valid next address is appearing on the SA lines to allow devices to respond. The BALE signal is made low at time 532 when the BCLK signal undergoes a low to high transition. At this time the START* signal goes high and the CMD* signal goes low. The IORC* signal is made low on the falling edge of the BCLK signal at time 534 to indicate that an I/O read operation is occurring and the BE*<3-0> signals floated. The cycle proceeds to the rising edge of the BCLK signal at time 536 and to the falling edge of the BCLK signal at time 538. At the falling edge of the BCLK signal at time 538, the IO16* signal is sampled to determine if this will be a 16 bit operation. In cycle AE this is a 16 bit operation and the IO16* signal is low at this time. At time 538, the system board samples the CHRDY line to determine if the device which is responding is ready within the normal time cycle. In the case of cycle AE it is not, and therefore at least one wait state will be added. The system board responds to the CHRDY signal in a similar manner during memory space operations, as will be seen more clearly in the state machine description. The cycle proceeds to the next rising edge of the BCLK signal at time 540 where the CHRDY line is again sampled. In the case of cycle AE, the CHRDY signal is still low to indicate that the I/O device is not yet ready. Therefore, the cycle continues until the next rising edge of the BCLK signal at time 544. In this case, the CHRDY signal has gone inactive or to the high state to indicate the device is ready. Therefore the completion of the cycle commences. At time 546 (or before time 548), the EX32* signal is lowered to indicate to the master unit that the cycle is completing. At the rising edge of the BCLK signal at time 548, the IORC* signal is made high to indicate the termination of the ISA standard I/O read operation, the CMD* signal is made high and the data which has been presented on the lower 16 bits of the data bus is properly routed and latched in latches 900C, 902C, 904C and 906C, as appropriate, for presentation to the master unit.

On the falling edge of the BCLK signal at time 550, because this is the end phase of the cycle AE and beginning of cycle AF, a new address value and M-IO signal, and possibly W-R and BE*<3-0> signals, are presented. Additionally, the data in the latches 900C, 902C, 904C and 906C is enabled to the proper data lines. On the rising edge of the BCLK signal at time 552, the data which had been enabled from the system board to the proper data lines is latched in and read by the master unit. Additionally, the W-R and BE*<3-0> signals are presented, if not previously done, and the START* signal is made low.

Cycle AF has commenced at time 550 and is a 32 bit read operation to the I/O space, which will be responded to be a 32 bit extended standard device which does not require any wait states.

At the falling edge of the BCLK signal at time 554, the BALE signal is made high to indicate to all devices that an address is available for interpretation. In this case, at the next edge of the BCLK signal, a rising edge at time 556, the EX32* signal is low indicating that a 32 bit device will respond. Additionally, the START* signal is made high and the CMD* signal is made low to indicate the transition to the next portion of the cycle and the BALE signal is changed to a low state. At the falling edge of the BCLK signal at time 558, the MREQx* line is allowed to go high to indicate that the master unit's interval is completing. At time 558 the address lines and the BE*<3-0> and the M-IO signals are released. At time 560 the W-R line, which has generally been held low because this has been a read operation sequence is released by the master unit. Additionally, at the rising edge of the BCLK signal, which occurs at time 560, the CMD* signal is made high to indicate the end of the cycle and the data which has been presented by the 32 bit extended standard device is sampled by the master unit. At time 560 the START* signal is allowed to float for use by the next bus controller. The MAKx* line is made high at time 562 by the priority controller on the system board to acknowledge the passing of control.

Exemplary I/O space write operations by the 32 bit master unit as shown in FIG. 5 are similar to I/O space read operations, except that the IOWC* signal is asserted instead of the IORC* signal during the 8 and 16 bit ISA standard operations and the W-R line is generally held in the high state, in contrast to its low state condition in the read operation.

Additionally, the data presented by the various devices is present for different times as befitting the different operation. In the 24 bit write operation which is performed in cycle AE of FIG. 5, the data is presented by the master unit at time 506 and is latched by the system board after time 508, when it is determined that a 32 bit extended standard device will not be responding to the I/O operation request. This data is then properly channeled by the system board according to the addressing information and the response of the IO16* signal. The data is then presented by the system board until time 530, which it is noted is one-half BCLK signal cycle after the removal of the assertion of the IOWC* signal. This extension of the data on the data lines is again to provide compatibility with the previous ISA standard where the write cycles were presented one-half signal cycle longer than the read information. At time 530, the remaining or next group of data which must be written to the responding device is presented on the data lines as appropriate as determined by the state of the BE*<3-0> signals, which device is currently responding, and how many bytes remain in the operation. The data is presented until one-half BCLK signal cycle after the IORC* signal is released at time 550.

Cycle AF shows a write operation for a 32 bit extended standard cycle. In this case, it must be noted that the data is presented by the master unit until time 562, one-half BCLK signal cycle after the CMD* signal is made high, which normally indicates the end of a cycle. This is so that standard and analogous logic can be used by 32 bit I/O extended standard devices as is used by 8 and 16 bit I/O ISA standard devices for write cycle operations.

Figure 6:
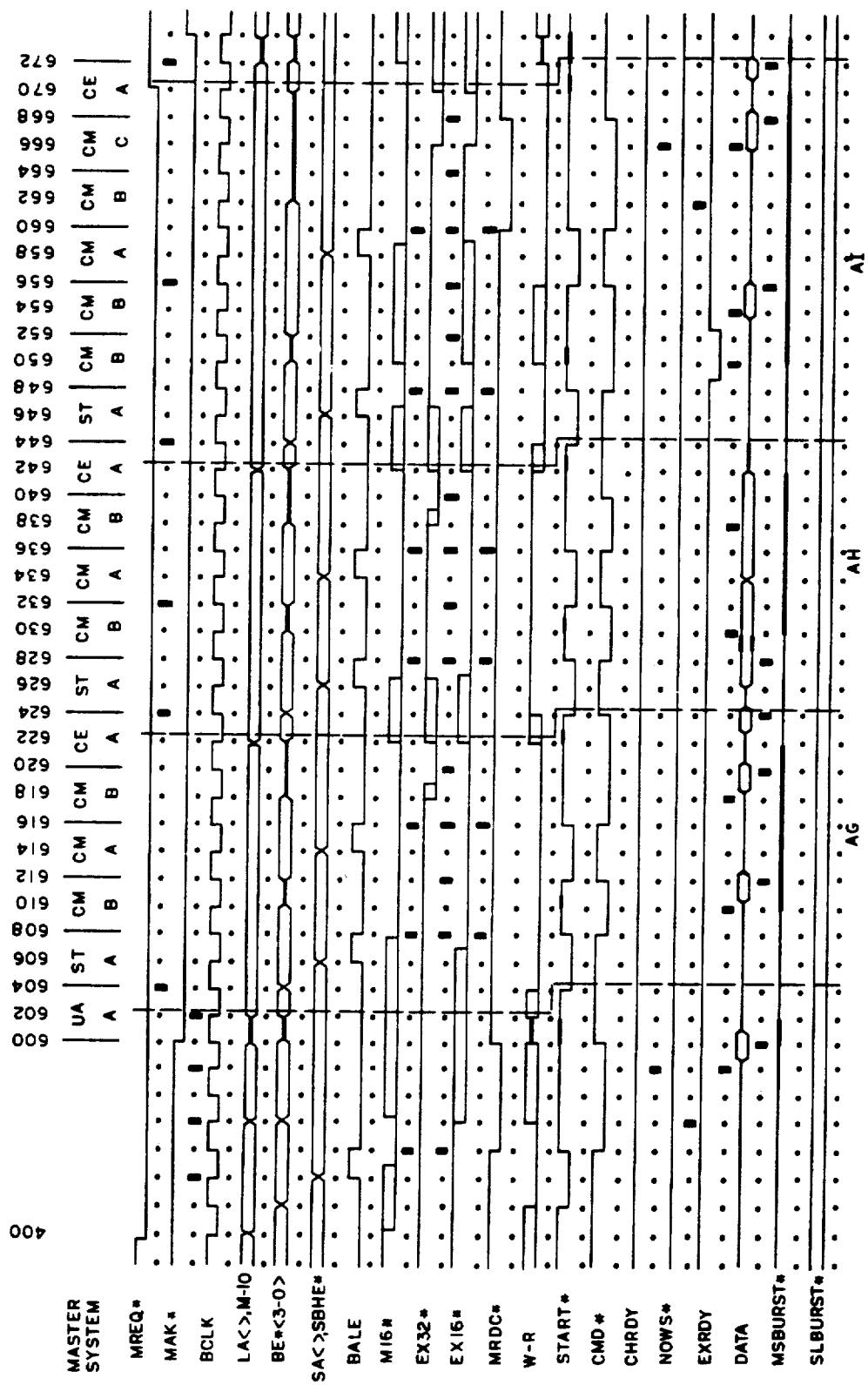

While previously the devices utilizing the extended standard have been described as 32 bit devices, 16 bit master devices and 16 bit slave devices are also capable of being utilized using the extended standard. FIG. 6 shows examples of the timing for 32 bit operations being performed by a 32 bit extended standard master unit to 16 bit extended standard and ISA slave units. At the rising edge of BCLK at time 600 a control cycle for the master unit commences. At the falling edge of the BCLK signal at time 602 the master unit gains control of the bus and asserts the address and M-IO signals and may optionally present the BE*<3-0> signals and the W-R signal. This is the beginning of the cycle AG which is a 32 bit read operation which is responded to by a 16 bit extended standard responding or slave unit. At the rising edge of the BCLK signal at time 604 the master unit lowers the START* signal and must have presented the BE*<3-0> and W-R signals valid. At the falling edge of the BCLK signal at time 606, the system board raises the BALE signal and transfers the address information from the LA<31-2> and BE*<3-0> lines to the SA<19-0> and SBHE* lines. Prior to the next rising edge of the BCLK signal at time 608, the 16 bit extended standard slave unit must lower the EX16* signal to indicate that a 16 bit extended standard slave unit will be responding. Additionally, the system board lowers the M16* signal prior to that same time based on the lowering of the EX16* line by the extended standard device. The system board can transfer the EX16* and EX32* values to the M16* line at all times or when 16 bit ISA standard master units are operating, as described in more detail later.

At time 608, the master unit raises the START* signal and the system board lowers the CMD* signal to indicate that the cycle is proceeding. At this time, the master unit and the system board sample the M16*, EX32* and EX16* signals to determine the size of the responding slave unit. In this case, because the EX32* signal is high, and the EX16* signal is low, it is determined that an extended standard 16 bit device will be responding. At time 610, which is the falling edge of the BCLK signal, control of the BE*<3-0> lines and the START* line are transferred from the master unit to the system board bus controller. This is done as previously indicated with both units driving the bus for a period of time to allow smooth transition. Also at time 610 the system board evaluates the EXRDY line to determine if wait states will be needed. At the rising edge of the BCLK signal at time 612, the system board is now in control of the BE*<3-0> lines and the driving of the cycle. The system board drives the START* signal low and the CMD* signal high to indicate that a second extended cycle will be occurring to allow the second word of data to be obtained. During the interval before time 612, the system board will have properly changed the BE*<3-0> signals to present the proper memory address for use by the slave unit, which are driven onto the bus at time 612. It is noted that a 16 bit extended slave must fully decode the BE*<3-0> signals to develop the lower 3 bits of address utilized by the unit. Additionally, the data which is provided on the lower 16 data lines is latched into the appropriate latches for storage and assembly by the system board.

At time 614, the falling edge of the BLCK signal, the system board asserts the BALE line and the SA lines for possible response by an ISA standard device. At time 616, the BALE signal is removed and again the M16*, EX32*, and EX16* signals are sampled to determine the responding size and type of the slave unit and the START* signal is raised and the CMD* signal is lowered to indicate progression in the cycle. At the falling edge of the BCLK signal at time 618, the system board can remove the BE*<3-0> signals from the bus to allow the lines to float and allow an easy transfer to the master unit at the completion of the cycle. Additionally at this time, the EXRDY signal is sampled to determine if the slave unit is ready or will need wait states. In the example of cycle AG no wait states are necessary. At time 618 or before the rising edge of the BCLK signal at time 620, the system board lowers the EX32* line to indicate to the master unit that data assembly is completing and that a proper value will be being returned.

At time 620, the master unit samples the EX32* signal and the system board raises the CMD* signal, latches the data available on the D<15-0> lines and transfers this data to the appropriate latches 900C and 902C for presentation on the upper word 32 bit double word data lines. At time 622, the falling edge of the BCLK signal, the master unit presents the next address on the LA<31-2> lines and the appropriate M-IO signal level for the operation to be performed. This is the beginning of the next cycle AH. The master unit can drive the BE*<3-0> and W-R lines at this time or at the next edge of the BCLK signal. Additionally at time 622, driving of the START* signal transfers from the system board to the master unit. At time 624, the cycle AG data phase is completing and the cycle AH address phase is in operation. At time 624 the master unit must have fully presented the BE*<3-0> and W-R signals in their proper mode. Cycle AH is a write operation, so the W-R signal is in a high state, indicating this write operation. Additionally at this time, the master unit lowers the START* signal and latches the data which has been presented at this time by the system board.

At time 626, the falling edge of the BCLK signal, the system board raises the BALE line for indication to ISA standard devices and asserts the SA<19-0> and SBHE* lines. Also at time 626, the master unit presents the data on the D<31-0> lines. At time 628, the rising edge of the BCLK signal, the system board lowers the BALE signal and the CMD* signal. At this time, both the master unit and the system board sample the M16*, EX32* and EX16* signals to determine the size of the device responding. In this case, a 16 bit extended standard device will be responding to a 32 bit write operation. Because of the need for data transfer, the system board latches the data values in the latches 900D, 902D, 904D and 906D at this time. At time 630, the falling edge of the BCLK signal, the master unit releases the BE*<3-0> lines and both units begin the transfer of operation of the START* line and in this case, the D<31-0> lines. Double driving of the data lines D<15-0> is necessary for a short interval because the system board must transfer in a later subcycle some of the data which has been provided by the master unit. At time 630, the system board also samples the EXRDY line to determine if the responding 16 bit extended slave unit will be needing an additional wait state in its operation.

At the rising edge of the BCLK signal at time 632, the system board presents the next address signals on the BE*<3-0> lines, lowers the START* signal, raises the CMD* signal. At time 634, the falling edge of the BCLK signal, the system board raises the BALE line and asserts the proper addresses on the SA<19-0> and SBHE* signals. Also at this time, the system board removes the data from the lower 16 bits of the data lines and begins presenting the upper 16 bits of data on the lower 16 data lines. This is the disassembly or transfer of the data to allow its use by the 16 bit extended slave unit. At the rising edge of the BCLK signal at time 636, the BALE signal is lowered and the M16*, EX32* and EX16* signals are again sampled to determine the size of the responding slave unit. Also at this time, the START* signal is raised and the CMD* signal is lowered to indicate procession of the subcycle. At the falling edge of the BCLK signal at time 638, the system board determines status of the EXRDY signal to determine if a wait state will be necessary. In the instance of cycle AH, wait states will not be needed. At time 638 the system board stops driving the BE*<3-0> lines. At this time or at least before time 640, the rising edge of the BCLK signal, the system board lowers the EX32* signal, indicating to the master unit that data transmission is completing. At time 640, the system board raises the CMD* signal.

At the falling edge of the BLCK signal at time 642, the address phase of cycle AH is completed and the address phase of cycle AI commences. The address phase commences for cycle AI as it has for cycles AG and AH. Additionally at time 642, the data is removed from the data lines D<15-0> because the slave unit will now have completely stored the data and control of the D<31-0> lines and the START* signal is returned to the master unit. At time 644, the rising edge of the BCLK signal, the master unit lowers the START* signal. At time 646, the next edge of the BCLK signal, the system board raises the BALE signal for use by the ISA devices which might exist and presents the SA<19-0> and SBHE* address values. At time 648, the system board lowers the BALE line and both the master unit and the system board sample the M16*, EX32* and EX16* signals to determine responding device size. Additionally, the master unit raises the START* signal and the system board lowers the CMD* signal. At time 650, the falling edge of the BCLK signal, the master unit relinquishes control of the BE*<3-0> lines and both units begin driving the START* signal to allow passing of its control. Also at this time, the system board samples the EXRDY line to see if it is low, indicating the need for wait states. In the case of cycle AI, which is 32 bit read operation which will be responded by a 16 bit extended standard device and a 16 bit ISA standard device, the EXRDY signal is low indicating the need for at least one wait state. The master unit does not sample the EXRDY signal because a matching device was not responding, as determined at time 648, the EX32* signal indicating the end of the cycle.

At time 652, the rising edge of the BCLK signal, the system board presents the new BE*<3-0> signals which have been properly changed by the system board. At time 654, the falling edge of the BCLK signal, the system board samples the EXRDY signal to determine if yet another wait state is necessary. In the instance of cycle AI, no additional wait states are necessary and so completion of the cycle can proceed. At the rising edge of the BCLK signal at time 656, the system board lowers the START* signal and raises the CMD* signal to indicate the next subcycle operation and samples or latches the data which has been presented in the lower 16 bits of the data lines. At time 658, the falling edge of the BCLK signal, the system board raises the BALE signal and presents the SA<19-0> and SBHE* signals. At time 660, the rising edge of the BCLK signal, the BALE signal is lowered, the START* signal is raised and the CMD* signal is lowered by the system board. Additionally, the M16*, EX16* and EX32* signals are sampled. At time 660, the system board lowers the MRDC* signal as necessary to indicate to the ISA device that a read operation was in effect. At the falling edge of the BCLK signal at time 662, the system board removes the BE*<3-0> signals to be removed and thus floats the lines to allow simple transfer to the master unit. Because at time 660 the system board sampled the M16*, EX32* and EX16* signals and determined that a 16 bit ISA standard device will be responding, at time 662 the system board samples the NOWS* signal to determine if this will be a short cycle as defined in the ISA or whether a more standard length cycle will be utilized.

Because the NOWS* signal is high, the cycle proceeds to time 666, the next falling edge of the BCLK signal where the completion of the 16 bit cycle is developing. The system board samples the CHRDY signal to determine whether this is a slave unit which will need wait states. In the case of cycle AI, no wait states are necessary and therefore the system board lowers the EX32* and EX16* signals to indicate completion of the cycle. At time 668, the rising edge of the BCLK signal, the system board raises the MRDC* and CMD* signals and latches the data which is present on the lower 16 bits of the data line, which is transferred to the upper 16 bits of the 32 bit data double word. At time 670, the falling edge of the BCLK signal, the MREQx* signal is raised, indicating that this master unit has completed with its operations and thus a passover of control of the bus from the particular master unit to the next master unit or bus controller will commence. Also at time 670, the address values present can change as well as the W-R line. Finally at time 670, the control of the START* signal is passed from the system board the master unit. At time 672, the rising edge of the BCLK signal, the cycle AI is completing and the data which has been presented by the system board onto the 32 bit lines at time 670 is latched into the master unit. The transfer of control from one master unit to the next proceeds after time 672.

Figure 7:
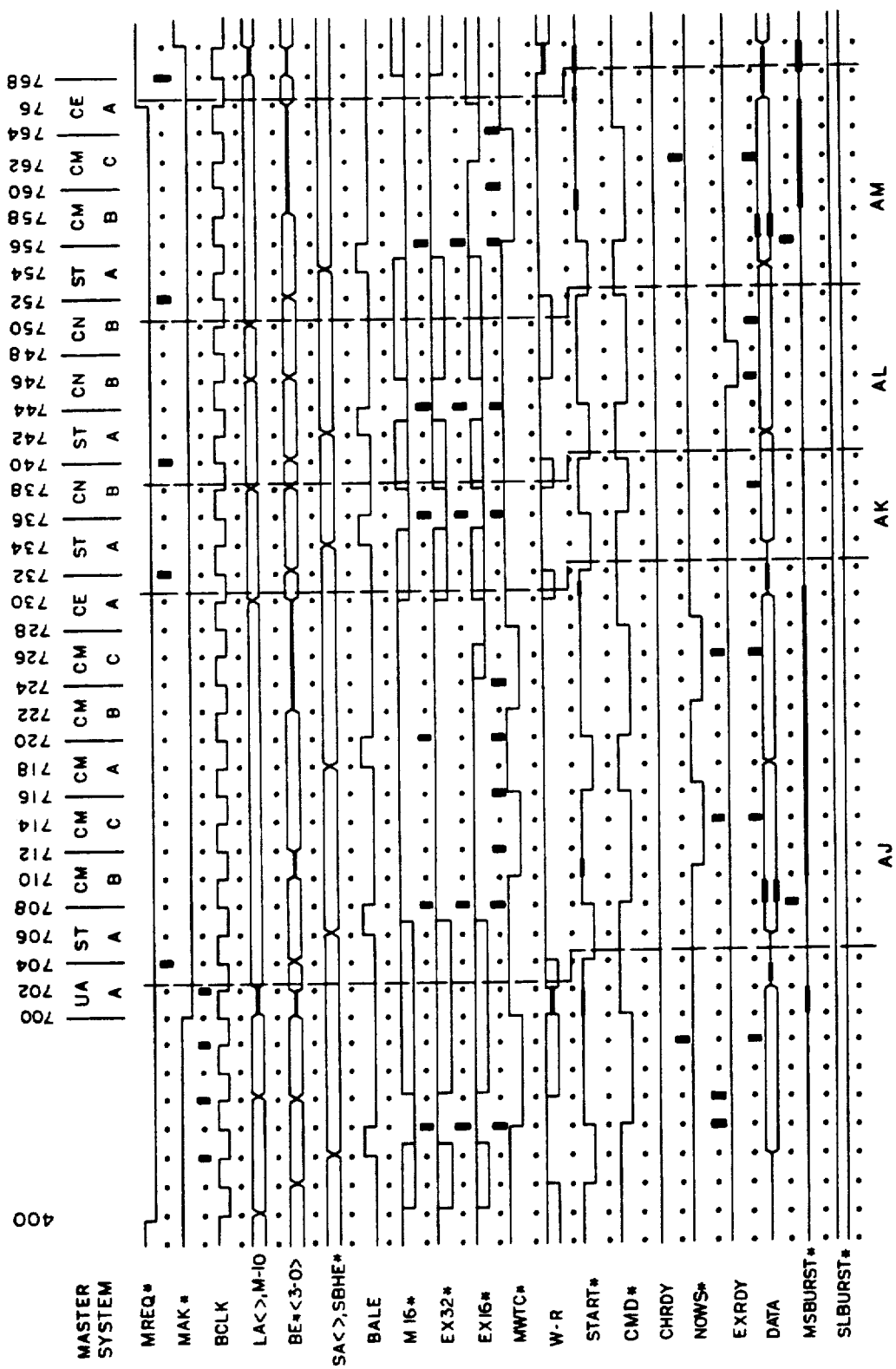

FIG. 7 shows operation of a 16 bit extended standard master unit with 8 and 16 bit ISA standard slave units and 16 and 32 bit extended standard slave units. The 16 bit extended standard master must fully drive the BE*<3-0> lines even though only a limited number of cases are used. Additionally, the 16 bit extended standard master must monitor the EX32* signal as well as the EX16* signal because 32 bit extended standard devices can respond properly in normal times with no data transfer or assembly required.

At time 700, the rising edge of the BCLK signal, the master unit receives permission to take control of the bus where the MAKx* signal goes low. The master unit begins driving the bus at time 702, a falling edge of the BCLK signal, when it presents the LA<31-2> and M-IO signals. At time 704, the rising edge of the BCLK signal, the master unit must have presented the BE*<3-0> and W-R signals and drives the START* signal low. At the falling edge of the BCLK signal at time 706, the system board raises the BALE signal and presents the SA<19-0> and SBHE* signals. Additionally at this time, because this is a write operation, the master unit begins providing the data on the D<15-0> lines. At the rising edge of the BLCK signal at time 708, the system board lowers the BALE signal and the CMD* signal while the master unit raises the START* signal. Both units sample the M16*, EX32* and EX16* signals to determine the size and type of the device which will be responding. In this case, all the signals are high, indicating that an 8 bit ISA standard device will be responding to the memory write request. Therefore at time 708 the system board latches the data which is presented by the master unit. At time 710, the falling edge of the BCLK signal, the master unit releases the BE*<3-0> lines and begins transferring control of the START* and data lines to the system board. Additionally at this time, the system board lowers the MWTC* signal to indicate to the ISA standard device that a write operation is occurring. At the rising edge of the BCLK signal at time 712, the system board presents the next addresses on the BE*<3-0> lines.

On the falling edge of the BCLK signal at time 714 the system board samples the NOWS* signal according to ISA standard timing to determine if this is a shortened cycle. In this example it is a shortened cycle. At the rising edge of the BCLK signal at time 716, the system board raises the MWTC* and CMD* signals and lowers the START* signal. At the falling edge of the BCLK signal at time 718, the system board raises the BALE signal and presents the next SA<19-0> and SBHE* signals for use by the ISA device. Additionally at this time, the system board changes the data being presented on the D<7-0> lines to the higher byte which was presented by the master unit. At the rising edge of the BCLK signal at time 720, the system board lowers the BALE signal and the CMD* signal and raises the START* signal. Additionally at this time, the system board samples the M16*, EX32* and EX16* signals to determine what device will be responding. Once again, an 8 bit ISA standard device is responding. Thus, at time 722, the falling edge of the BCLK signal, the system board stops driving the BE*<3-0> lines and lowers the MWTC* signal. Operations then proceed to the next falling edge of the BCLK signal at time 726, where the system board samples the NOWS* signal and determines that this is a shortened cycle according to the ISA standard. Thus after this time, the system board lowers the EX16* signal to indicate that a 16 bit cycle is completing, the EX16* signal being monitored by the master unit for this purpose. At time 728, the rising edge of the BCLK signal, the MWTC* signal and the CMD* signal are taken high by the system board. Additionally at this time, the master unit samples the EX16* signal and determines that a cycle is completing because the EX16* signal is low. At time 730, the falling edge of the BCLK signal, cycle AJ is completing and the address portion of cycle AK is commencing. Thus, the master unit presents the new LA<31-0> and M-IO values as well as the BE*<3-0> and W-R values, if desired. Additionally at this time, the system board removes the data from the D<7-0> lines because the slave device no longer needs them and the transfer of the data lines and the START* signal is initiated to the master unit.

Cycle AK is a 16 bit write operation which is responded to by a 32 bit extended standard device. At the rising edge of the BCLK signal at time 732, the BE*<3-0> and W-R signal values are valid and the master unit lowers the START* line. At time 734, the falling edge of the BCLK signal, the system board raises the BALE line and presents the SA<19-0> and SBHE* values for use by ISA standard devices. Additionally at this time, the master unit begins presenting the data on the D<15-0> lines. At the rising edge of the BCLK signal at time 736, the BALE signal and the CMD* signal are lowered by the system board and the START* signal is raised by the master unit. Additionally at this time, both devices determine the levels on M16*, EX32* and EX16* lines. In this case, all three values are low, indicating that a 32 bit extended standard device is responding. Cycle AK proceeds to the falling edge of the BCLK signal at time 738, which is the end of the cycle AK address phase and the beginning of the cycle AL address portion. Thus, the master unit presents the next set of address information as necessary. Also at time 738, the master unit checks the level of the EXRDY signal to determine if the device will be needing wait states. In this case it does not and so at time 740, the rising edge of the BLCK signal, the master unit lowers the START* signal and raises the CMD* signal to indicate the next cycle.

At time 742 the master unit removes the data of cycle AK from the data lines and drives the data of cycle AL. Also at time 742 the system board raises the BALE signal and presents the SA<19-0> and SBHE* lines. Cycle AL is a 16 bit write operation which is being responded to by a 16 bit extended standard slave so that when the master unit and system board sample the M16*, EX32* and EX16* signals at time 744, it is determined that a 16 bit extended standard device will be responding. Also at this time, the system board lowers the BALE signal and the CMD* signal while the master unit raises the START* signal. At the falling edge of the BCLK signal at time 746, the master unit can remove the address information if desired and does check the EXRDY signal to determine if this will be an extended cycle as indicated by the need for wait states. In this example, the 16 bit extended standard slave unit does need a wait state and so lowers the EXRDY signal prior to time 746 to indicate this need. The system stays in this hold mode until the next falling edge of the BCLK signal at time 750, where the master unit again samples the EXRDY signal and determines that it is high. Because at time 750 the master unit determined that no more wait states were necessary, this indicates the end of the address phase of cycle AL and the beginning of address phase of cycle AM. Thus at time 750, the master unit changes the address information if not previously done. At time 752, the rising edge of the BCLK signal, the master unit lowers the START* signal and the system board raises the CMD* signal.

At time 754, the falling edge of the BCLK, the system board raises the BALE signal and presents the proper values on the SA<19-0> and SBHE* signals for use by ISA standard devices. Additionally at this time, the write operation of state AL is fully completed and the master unit removes the information from the data lines and begins presenting new values because this is a write operation. At time 756, the rising edge of the BCLK signal, the system board lowers the BALE signal and the CMD* signal and the master unit raises the START* signal. Also at this time, both units sample the M16*, EX32* and EX16* signals to determine the type and size of the responding slave unit. In this case, only the M16* signal is low, indicating that a 16 bit ISA standard slave is responding. Therefore also at this time, the system board lowers the MWTC* signal to indicate to the ISA device that a write operation is occurring. Finally at this time, the system board latches the data which is present on the D<15-0> lines for transfer and driving when the system board takes over control.

At the falling edge of the BCLK signal at time 758, the master unit ceases driving the BE*<3-0> lines and passes control of the START* signal and the data lines to the system board. Also at this time, the system board monitors the NOWS* signal to see if this will be a short write cycle. In the case of cycle AM it is not, and so write cycle. The case of cycle AM it is not, and so the system proceeds. At the next falling edge of the BCLK signal at time 762, the system board samples the CHRDY signal to determine if the slave unit will need wait states. In this case, none are necessary and so the system board lowers the EX16* signal to indicate to the master unit that a cycle is completing. At time 764, the rising edge of the BCLK signal, the system board raises the CMD* and MWTC* signals and the master unit samples the EX16* signal and determines that it is low, thus indicating the end of a cycle. At time 766, the falling edge of the BCLK signal, the system board releases the EX16* signal and control begins passing to the next master as this master has completed its operation. At this time, the system board stops driving the data lines and control of the START* and data lines is transferred to the master unit. At time 768, the operation is fully complete and control passes from the master unit to the next master unit which will control the bus.

Figure 8:
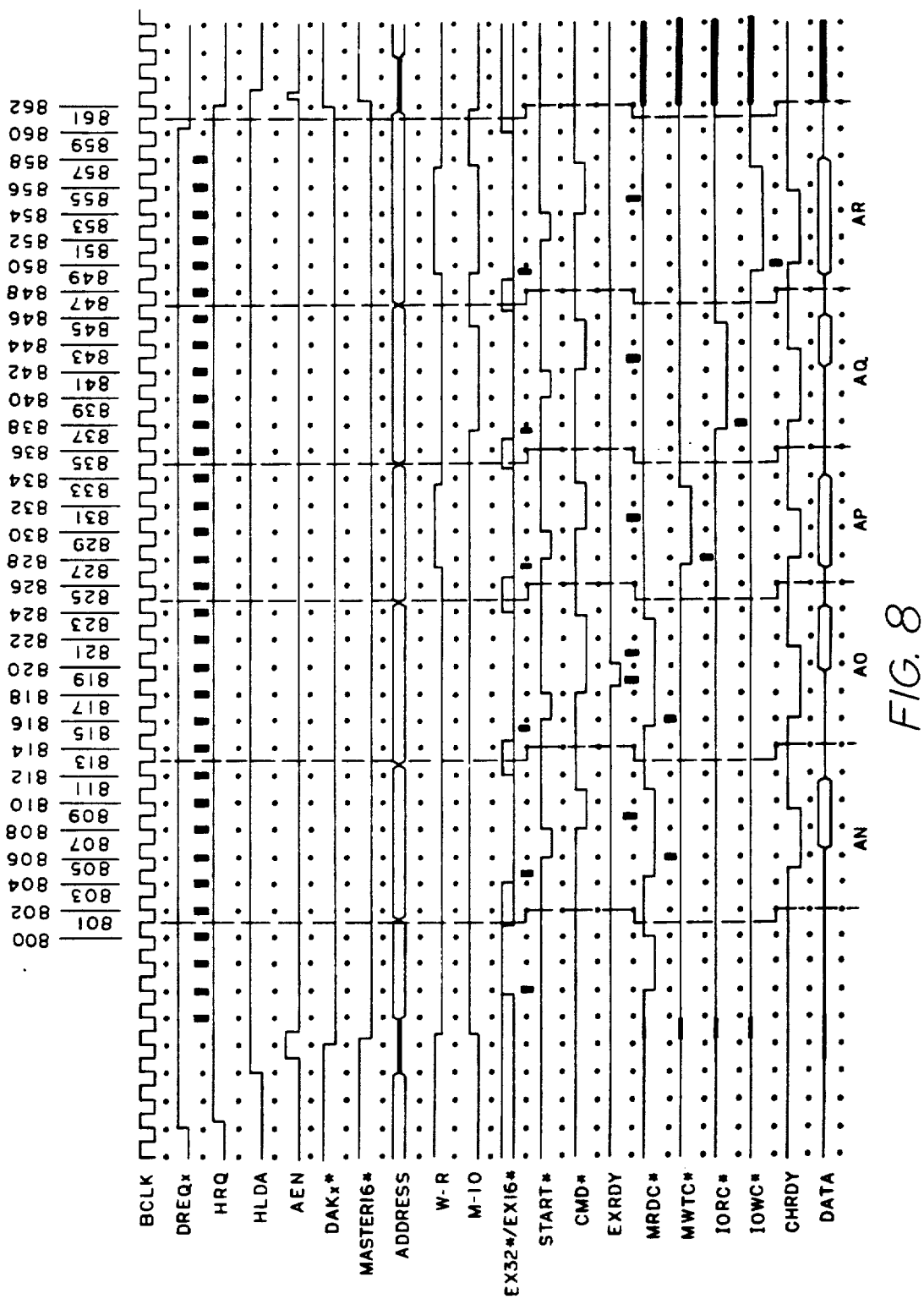

In addition to master units according to the extended standard being utilized in a system incorporating the present invention, master units which were previously developed under the ISA standard can be utilized. These master units were generally of a 16 bit data width. Because of the operation of the ISA standard, these master devices could only operate by initiating a request for a DMA cycle and then driving what was previously called the MASTER signal, and is now called the MASTER16* signal, to indicate to the DMA controller on the system board that it is not to drive the bus with addresses and control signals but is to allow the master unit to perform those operations until the DMA channel request has been completed. This is quite a cumbersome operation but as units were developed for this operation, it is desirable that the 16 bit ISA master unit be able to be utilized in a computer system utilizing the present invention. Therefore, provisions have been made for the transfer of data from a 16 bit ISA standard master unit to extended standard devices. The timing of the various signals is shown in FIG. 8 in cycles AN, AO, AP, AQ and AR. This is a slightly more complicated situation for the system board in that the 16 bit ISA standard master unit drives the LA<23-17> lines and the SA<19-0> and SBHE* lines while the system board must then drive the LA*<31-24>, LA<16-2> and BE*<3-0> signals. The system board must drive the LA*<31-24> lines because a 16 bit ISA standard master unit device addresses only the lower 16 Mbytes of memory and thus the upper 8 bits of the address must have a logical zero value. The system board must also determine when to drive the START* and CMD* signals and must drive the CHRDY signal to indicate to the master unit that the device is not ready while proper signals are being generated. Cycle AN in FIG. 8 is a memory read operation to extended standard save memory while cycle AO is a read operation with a wait state and cycle AP is a write operation to an extended slave. Cycle AP is an I/O read cycle to an extended standard device and cycle AR is a I/O write operation to an extended standard device.

Cycle AN commences at time 801 where the master unit presents the address values onto the bus and the system board then transforms these address values as necessary. The cycle proceeds to time 804, the rising edge of the BCLK signal, where the responding slave unit will have lowered the EX32* or EX16* signal as appropriate and the master unit lowers the MRDC* signal. The system board at time 805 determines that an extended standard device is responding and thus it must take control and transfer the data appropriately. Thus at time 805, the system board lowers the CHRDY signal to indicate to the master unit that the device is not ready. At time 806, the rising edge of the BCLK signal, the system board lowers the START* signal. At time 807, the falling edge of the BCLK signal, the data begins appearing on the data bus for receipt by the master unit. At time 808, a rising edge of the BCLK signal, the START* signal is raised and the CMD* signal is lowered by the system board. At time 809 the system board samples EXRDY and when it determines that the EXRDY signal is high, indicating that no extended standard device wait states will be necessary, the system board raises the CHRDY signal, thus indicating to the master unit that the cycle can complete. At time 811, the falling edge of the BCLK signal, the system board raises the CMD* signal and completes the ISA-type cycle. The data on the data bus then is removed by the slave unit and the cycle proceeds.

The events of cycle AO occur in a similar manner except that the system unit samples the EXRDY signal at time 819 and finds that the signal is low, thus indicating that the slave device needs an additional wait state. The cycle is then held until the falling edge of the BCLK signal at time 821, where the system board determines that the EXRDY signal is high and thus can complete the cycle as in cycle AN. Cycle AP is a write cycle that is similar in most manners to cycle AN except that the state of the W-R signal is driven high before time 828 based on the presence of the MWTC* signal being low. This is to indicate to the slave device that a write cycle is operating. Additionally, the data is present on the bus at different times as befits a write cycle in deference to a read cycle. Cycles AQ and AR are different in that they are I/O cycles which in operation differ somewhat in that there is an additional 1 BCLK cycle present before the assertion of the START* and CMD* signals to allow for extended I/O timing of the ISA standard device and the M-IO signal is asserted low.

Thus, the system board can cooperate with a 16 bit ISA standard master to properly transfer the data and generate the appropriate control signals and address signals necessary for use by extended standard slave devices. Therefore, 16 bit masters can be utilized in a system utilizing the extended standard.

Figure 9:
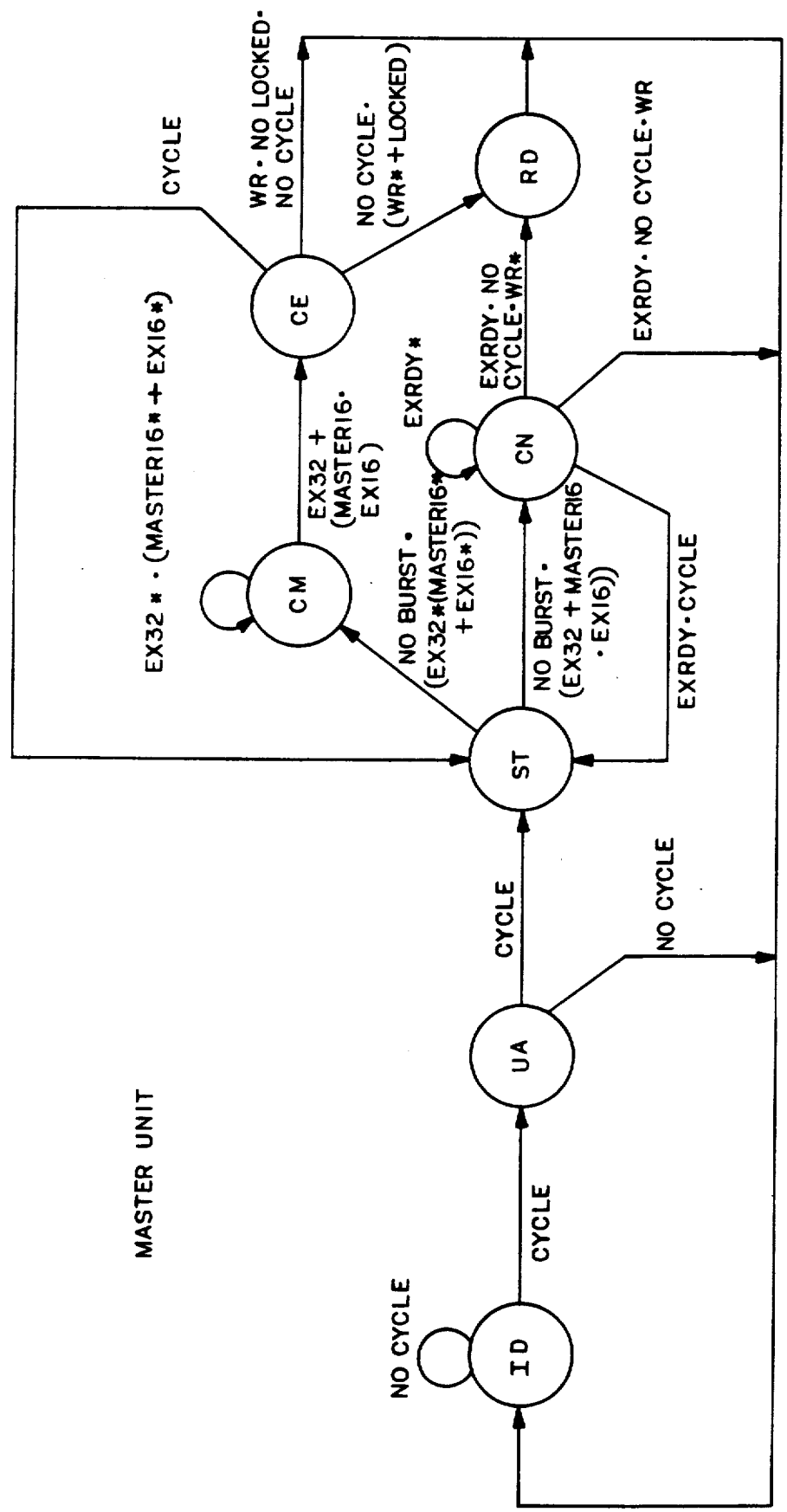
FIG. 9 is a state diagram indicating the operations of portions of the circuitry of a master unit in a computer system incorporating the present invention.

An exemplary state machine diagram showing the operation of the master unit is illustrated in FIG. 9. In explanation of the state machine diagram, branching or transfer conditions from a given state, which must be true at the next rising edge of the BCLK signal, are indicated next to the branch. All transitions in the state machine of FIG. 9 are made on the rising edge of the BCLK signal. The master unit operation begins at state ID where the state machine is in idle condition because no cycle is being performed, for example when the master unit is not in control of the bus. In state ID the master unit is floating al of its outputs because it is not in control of the bus. Control stays at state ID as long as there is no cycle being performed by the master unit. However, when the master unit does obtain control of the bus this is indicated by the presence of a CYCLE signal, so that at the next rising edge of the BCLK signal, control transfers to state UA. In state UA the master unit is coming into control of the bus and after the falling edge of the BCLK signal, the master unit presents the address on the LA<31-2> and BE*<3-0> lines and presents the M-IO and W-R signals. If there is no cycle being performed, control transfers from state UA to state ID and the master unit goes back into the idle condition.

If the master unit is to continue the cycle, control transfers from state UA to state ST, the start state. During state ST, the master unit drives the START* signal low. If the previous cycle was a read operation, on the rising edge of the BCLK signal at the beginning of the state ST, the master unit latches in the data present on the data lines from the previous read operation to complete the read operation. If a write operation is being performed, the master unit presents the data on the data lines on the falling edge of the BCLK signal. There are illustrated in FIG. 9 two transfers from the state ST. In this case, both conditions are transferred on a BURST operation not occurring, the BURST operation using a separate path which is illustrated in co-pending patent applications as previously referenced.

If this is a normal cycle which is being responded to by a properly sized extended standard slave unit and no data assembly or transfer is required, control proceeds from state ST to state CN. This condition is determined by the fact that there is not a BURST cycle and the EX32* signal or a combination of the MASTER16* and EX16* signals are low. In state CN, the master unit drives the START* signal high and samples the EXRDY signal on the falling edge of the BCLK signal. The sampling of the EXRDY signal is done so that the state machine can loop on the state CN until the slave unit indicates that it is ready. If the slave unit is indicating that it is ready, control transfers from state CN to one of three different states. If the master unit cycle is to continue, control returns to state ST. If there no cycle to continue and a write operation has been occurring, as indicated by the level of the W-R signal being high, control returns to state ID. If no cycle is to be performed and a read operation has been occurring, control transfers to state RD. In state RD, the data from the previous read operation is latched on the rising edge of the BCLK signal and the master unit removes itself from the bus by floating all of the outputs on the rising edge of the BCLK signal. Control transfers from state RD to state ID in all cases.

If, however, at state ST there was an indication that a cycle mismatch had occurred because of the need for data transfer or data assembly, as indicated by the EX32* signal being high and either the MASTER16* or EX16* signals being high, then control transfers to state CM. In state CM the master unit drives the START* signal high on the rising edge of the BCLK signal, but on the falling edge of the BCLK signal the master unit stops driving the START* signal as well as the BE*<3-0> signals and the D<31-0> lines on write operations. It is in this state that the control of these signals is passed from the master unit to the system board for data assembly and transfer operations. The control then loops on state CM until the EX32* signal goes low, indicating that the system board has completed data assembly and transfer or if the MASTER16* signal and the EX16* signal are both low, indicating that data is available for the 16 bit master unit. Control proceeds to state CE. In state CE, the master unit starts driving the START* signal high to initiate the retransfer of the various lines back to the control by the master unit. On the falling edge of the BLCK signal, the master unit then drives the next set of addresses, the BE*<3-0>, W-R and M-IO lines as appropriate. If a cycle is to be performed, that is the master still has control of the bus, control returns to state ST. If there is no cycle to be completed and this has been a write operation and the unit has not been in locked operation, that is operation wherein the master unit has locked operation to other devices, then control returns to state ID. If there is no cycle pending and either a read operation has been occurring or the system has been in locked mode, then control returns to state RD.

Thus, it can be seen that operation of the master unit which incorporates the present invention which utilizes two separate sets of state information and address control lines is simple and straightforward, especially compared to the complexity which would have resulted had the master unit been required to handle the full range of possibilities.

Figure 10:
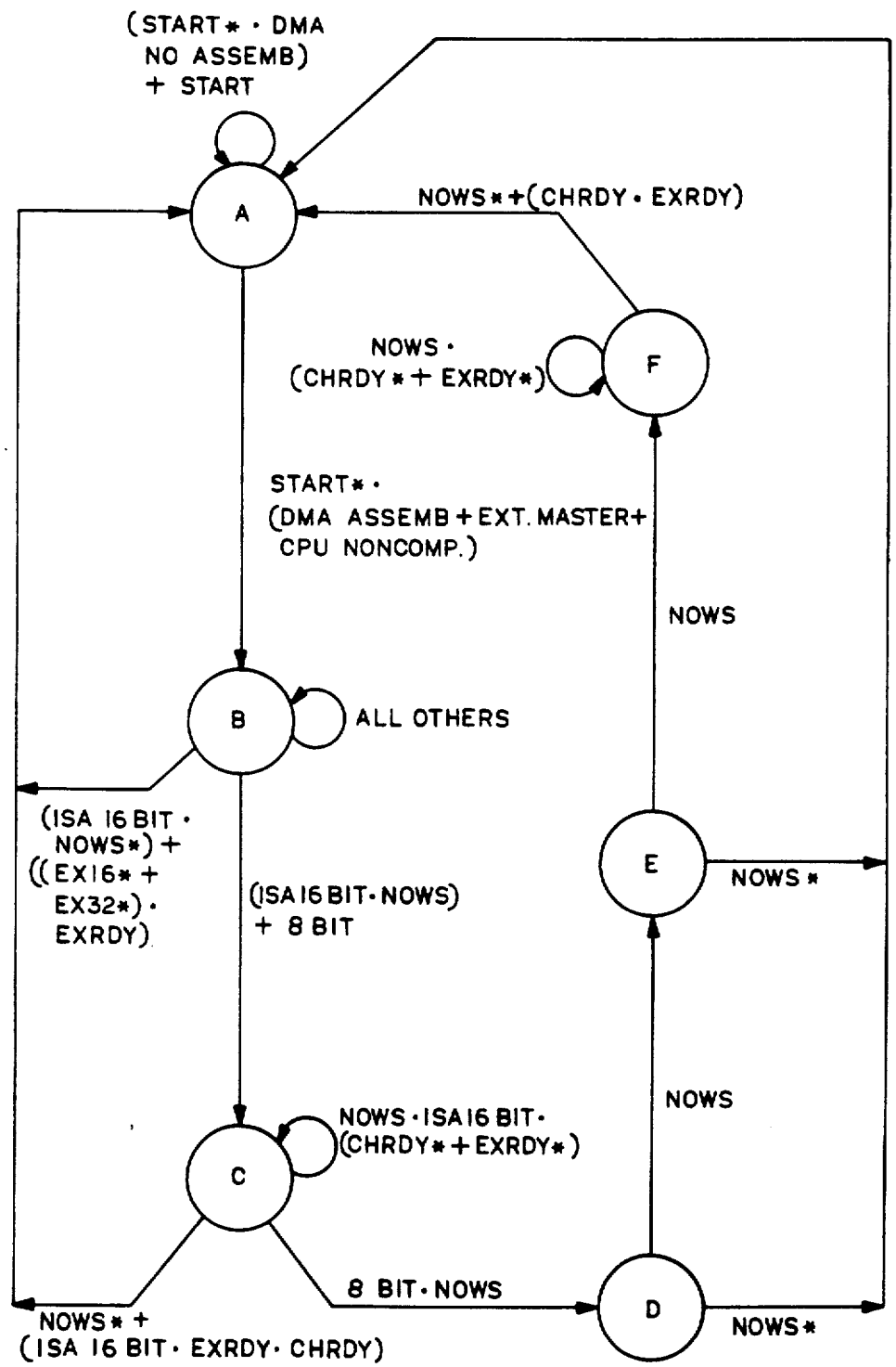
FIGS. 10 and 11 are state diagrams indicating the operations of portions of the circuitry of a system board when cooperating with a master unit in a computer system incorporating the present invention.

The system board utilizes several different state machines and combinatorial logic to perform the functions required in the given states and portions according to the timing diagram. A first or main state machine is illustrated in FIG. 10. The main state machine transfers or clocks forward on the rising edge of the BCLK signal. The idle state is state A. There are two possible branches from state A, either back to state A, which occurs either when the START* signal is false, that is high, or when the START* signal is true or low and DMA operations are in process which do not require data assembly, because the DMA controller handles the signals in that case. The state machine leaves state A and goes to the next state, state B, when the START* signal is low and either DMA assembly is required or an external master is in control of the bus or the central processor located on the system board is doing a non-compressed cycle. Non-compressed cycles have not been explained in detail because they cannot be performed by a master unit.

There are two valid exits from state B. The first exit is from state B to state A and is performed if a 16 bit ISA standard device is responding and the NOWS* is low, which would be true only for fast ISA standard memory devices, or if either of the EX16* or the EX32* signals is low and the EXRDY signal is high, thus indicating that no wait states are necessary. If an 8 bit device is responding or if a 16 bit ISA standard device is responding and the NOWS* signal is high, control proceeds to state C. The NOWS* signal will be high for all 16 bit ISA standard I/O devices because they would not lower the NOWS* signal until later in the cycle because of the delayed I/O cycle timing. The NOWS* signal would be high for 16 bit ISA standard memory devices because this is the default path and any fast memory devices would have transferred to state A. In all other cases, control remains at state B and loops. Generally, this looping at state B condition is the not ready or wait state condition for extended standard devices.

In state C, there are again two exits and a looping back to itself. The first exit is a return to state A, which occurs if the NOWS* signal is low or a 16 bit ISA standard device is responding and the EXRDY and CHRDY signals are both high, indicating the normal termination of a 16 bit cycle. Control stays in state C if the NOWS* signal is high or false and a 16 bit ISA standard device is responding and either the CHRDY signal or the EXRDY signal is low, indicating that a wait state is needed. This is the 16 bit ISA standard wait state loop. If an 8 bit device is responding and the NOWS* signal is high, control proceeds to state D.

Control proceeds from state D to state A if the NOWS* signal is low. If the NOWS* signal is high, control proceeds to state E. From state E the state machine advances to state A if the NOWS* signal is low. Otherwise the state machine advances to state F if the NOWS* signal is high. State F is the final state in the state machine. Control proceeds to state A if the NOWS* signal if low or if both the CHRDY and EXRDY signals are high, indicating normal termination of an 8 bit cycle. If the NOWS* signal is high and either the CHRDY or EXRDY signals are low, then control remains in state F until the 8 bit device wait states are completed.

Figure 11:
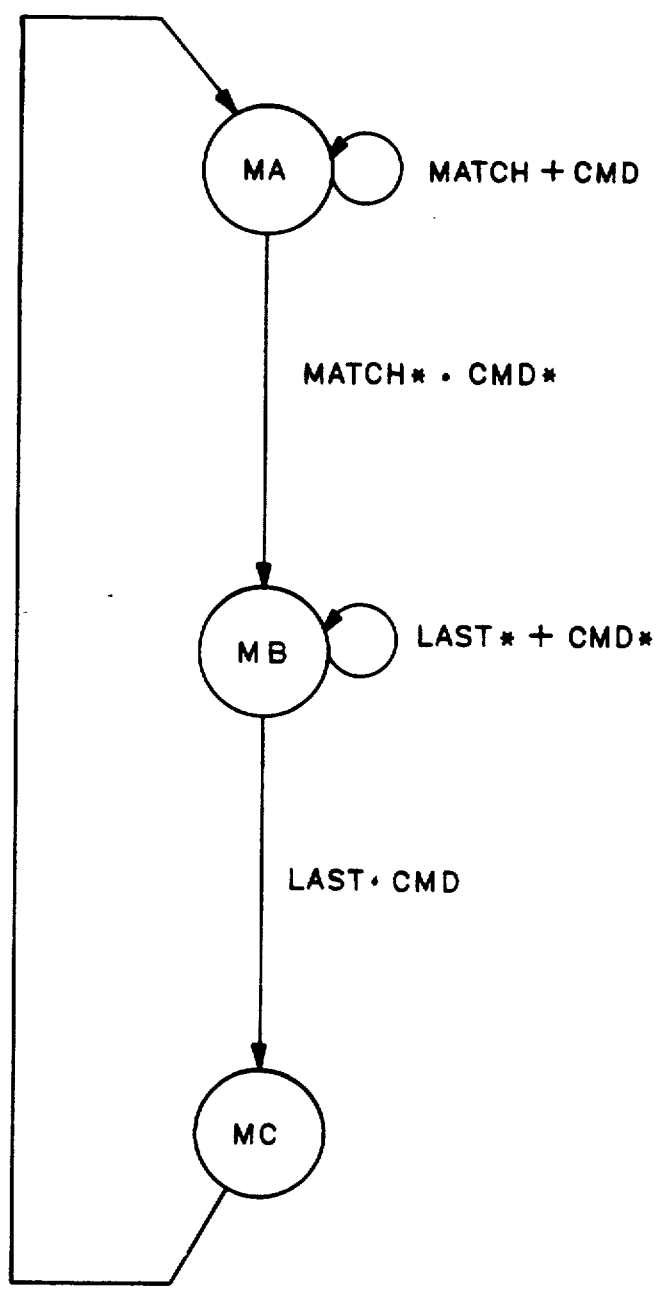

The second state machine utilized in the system board is the mismatched state machine shown in FIG. 11. The mismatched state machine advances on the falling edge of the BCLK signal and has three states. The first state or idle state is the MA state. Control stays at the MA state if a match condition exists or if the CMD* signal is high. The match signal used to indicate a match condition is described in detail below. Control transfers from state MA to state MB if the MATCH* signal is low and the CMD* signal is low, indicating that a mismatch has occurred and that data assembly or transfer is required. State MB is considered to be the mismatched state of this machine and stays active while the LAST or the CMD* signals are low. The LAST signal is defined below. Control transfers from state MB to state MC if this is the last transfer cycle and the CMD* signal is high. State MC is the redrive signal and is used to drive the data back onto the bus when the master unit has been requesting a read operation and the system board has done the data assembly.

The MATCH signal is a signal which is latched on the positive edge of the BCLK signal and has the following equation:

$$MATCH = (((MASTER16*19 \cdot EX16*) + EX32*) \cdot NOTDMA \cdot START*) + \cdot (MATCH \cdot CMD*)$$

Thus, the MATCH condition is set if there is a 16 bit master responding, a 16 bit extended device is responding and a DMA cycle is not in progress or if a 32 bit extended standard device is responding and the START* is low, or when the MATCH signal is high and the CMD* signal is low at the rising edge of the BCLK signal. The EX32* case is a match because a 32 bit extended standard device can respond to a 16 or 32 bit extended standard device, so a match condition exists. If a 16 bit extended standard device is responding and a 16 bit extended standard master is controlling the bus, a match condition also exists. The MATCH signal condition extends the length of the MATCH signal.

The mismatched state machine also requires a determination of when the last byte or bytes to be transferred between the slave and the system board have been developed. This is done by the use of a series of different equations. Four signals are developed which are called the NMSK<3-0> signals, which are developed as the outputs of a series of four flip-flops which are latched on the rising edge of the BCLK signal. The NMSK signal equations are as follows:

$$NMSK<3> = 1$$

$$NMSK<2> = 32BIT + 16BIT + BE<1> + \cdot BE*<2> + BE*<3>$$

$$NMSK<1> = 32BIT + (16BIT \cdot BE*<1>) + BE*<2> + (BE*<3> \cdot BE*<1>) + (16BIT* \cdot BE<0>)$$

$$NMSK<0> = 32BIT + (16BIT \cdot BE*<1>) + (16BIT \cdot BE*<2>) + (BE*<2> \cdot BE*<0>) + \cdot (BE*<3> \cdot BE*<1>)$$

In the NMSK equations, the 32BIT signal indicates that a 32 bit device will be responding, the 16BIT signal indicates that a 16 bit device is responding and the various BE* or BE signals are those which have been requested or are now being presented on the bus by the system board. From these NMSK values, the LAST signal is developed as follows:

$$LAST = NMSK<2> \cdot NMSK<1> \cdot NMSK<0>$$

Thus, when the 3 bits are high, this is an indication that all the data has been developed and the final cycle is in progress.

During mismatch cycles, as indicated by the presence of state MB, the system board must drive the BE* signals, the START signal, the data lines if appropriate, and must generate the EX32*, EX16* or M16* signals. The BE*<3-0> signals are generated by the following equation:

$$BE^*<3\text{-}0> = LBE^*<3\text{-}0> \cdot NMSK<3\text{-}0>$$

The new BE* values are latched in at the rising edge of the CMD* signal. The LBE*<3-0> values are those originally presented by the master unit at the beginning of the cycle which are latched by the system board.

The START* signal input to the output buffer on the system board is generated by the combination of the LAST* signal and the NSA signal and is based on the rising edge of the BCLK signal. The NSA signal is a signal which is generated by the main state machine to indicate that the next state of operation will be state A and an appropriate equation would be the branches from states B, C, D, E and F which lead to state A. The EX32* and EX16* signals are driven at the same time for the preferred 32 bit master unit system and have an equation as follows:

$$EX32^* = EX16^* = (MB \cdot NSA \cdot LAST)^*$$

The M16* signal is driven when an ISA master is in control of the bus based on the following equation:

$$M16^* = ((EX32^* + EX16^*) \cdot ISAMASTER)^*$$

Various operations occur within the system board at the various states. When entering state A, the system board drives the CMD* signal high and latches the data present on the bus if this was a read cycle and a mismatch existed as indicated by the match state machine being in state MB. When the BCLK signal goes low during state A and if the START* signal is asserted low, the system board drives the BALE signal high and transfers the data from the LA<31-0> and BE*<3-0> lines to the SA<19-0> and SBHE* lines. Additionally on this falling edge, if a mismatch occurred and a write operation is being performed, the next data value is placed on the data lines. Alternatively, if a read operation is occurring and the match state machine is in the redrive straight MC, then the assembled data is presented onto the data lines.

In state B, the system board drives the CMD* signal low and drives the ISA memory and I/O control signals, if necessary. Additionally, the system board drives the BALE signal low. Also at this rising edge, the system board latches the EX16* and EX32* signals for use in match determination. If there is no match and the mismatched state machine advances to state MB, then the data will be latched when proper.

In state C, the system board samples the CHRDY signal and latches the EXRDY signal and the IO16* signal on the falling edge of the BCLK signal. On the following BCLK cycles, the BCLK signal rising edge is used to latch the CHRDY signal if necessary.

The system board essentially has no real operations in state D and E except latching the NOWS* signal on the falling edge of the BCLK signal, which is done during every state. State F has similar functions as state C except that it applies for 8 bit devices.

The various states of the mismatched state machine are used to determine whether the START*, BE*<3-0> and data line signals are driven by the system board. In state MA, those signals are disabled on the system board. In state MB, this is a mismatched cycle is in operation and therefore the buffers or drivers are enabled so that the START*, BE*<3-0> and data lines are driven by the system board. Finally in state MC, the data redrive state, the system board drives the data which has been assembled onto the data bus during read cycles on the falling edge of the BCLK signal.

Returning now to cycles AA and AB as shown in FIG. 2, the various states of the master unit state machine and the system board main state machine are indicated for reference and tracking use. At time 402 the master unit state machine leaves state ID and enters state UA and the system board main state machine enters state A. The master unit asserts the address on the LA<31-2> lines and the M-IO signal at a high state on the M-IO line at time 404. At time 406, the master unit state machine proceeds to state ST while the system board main state machine remains at state A. The master unit lowers the START* signal and asserts the BE*<3-0> signals and W-R signal, if not previously done at time 404. Proceeding to time 408, the next edge of the BCLK signal, the system board raises the BALE signal and transfers the LA<19-2> lines to the SA<19-2> lines and converts the BE*<3-0> signals to the proper starting address value and presents this value on the SA<1-0> lines, in this case a value of 00.

At the next BCLK signal edge at time 410, the master unit state machine proceeds to state CM and the system board state machine proceeds to state B. The master unit state machine proceeded to CM because the EX32* signal was high, indicating a mismatch or assembly cycle was necessary. At this time, the master unit raises the START* signal and the system board lowers the CMD* signal and the BALE signal. The system board also lowers the MRDC* line because the M16* signal is low.

Advancing now to time 412, the master unit stops driving the BE*<3-0> lines and the START* line and the system board starts driving the START* line. At the next edge of the BCLK signal, the rising edge at time 414, the master unit state machine stays in state CM and the system board state machine proceeds to state A because the latched NOWS* signal is low and a 16 bit ISA standard device is responding. The system board latches the data presented on the data lines D<15-8> and D<7-0> into latches 904C and 906C for presentation of the data to the same data lines when appropriate. The system board lowers the START* signal and raises the CMD* signal to signal the next extended standard cycle, presents the new BE*<3-0> signals and raises the SMRDC* and MRDC* signals to signal the end of the first ISA standard read operation. Advancing to time 416, the system board raises the BALE signal and presents the new SA<1-0> values.

At the next edge of the BCLK signal at time 418, the master unit state machine stays at state CM and the system board main state machine proceeds to state B. At state B, the system board raises the START* signal, lowers the CMD* signal, the BALE signal, the MRDC* signal and the SMRDC* signal and latches the M16* signal state.

At the next falling edge of the BCLK signal, which occurs at time 420, the system board latches the NOWS* signal state, which is low and stops driving the BE*<3-0> lines. The system board lowers the EX32* signal because this is the last assembly cycle, a mismatch has occurred and the next state of the system board main state machine is state A, these conditions indicating the full cycle is nearing completion.

At time 422 the master unit state machine proceeds to state CE and the system board main state machine proceeds to state A. At time 422 the system board raises the CMD* signal and the SMRDC* and MRDC* signals and latches the data presented on the D<15-8> and D<7-0> lines into latches 900C and 902C. The data is stored in latches 900C and 902C because this ISA standard read operation was the high word of a double-word read.

The next edge of the BCLK signal, time 424 is the beginning of cycle AB, so the master unit asserts the next address on the LA<31-2> lines and the working space on the M-IO line. The system board raises the EX32* signal and presents the latched data to the D<31-0> lines for storage by the master unit based on the mismatched state machine entering state MC. At this time the master unit begins driving the START* signal and the system board stops driving the START* signal, returning control to the master unit.

At time 426 the master unit state machine proceeds to state ST and the system board main state machine proceeds to state A. The master unit sets the BE*<3-0> and W-R signals as needed and sets the START* signal low to indicate the end of cycle AA and the beginning of cycle AB. Additionally, the master unit stores the data on the data lines to complete the read operation. The system board floats its outputs to the data lines to allow the master unit to drive them if necessary.

Cycle AB proceeds at time 428, when the system board raises the BALE signal and asserts the proper address on the SA<19-0> lines.

Proceeding to the next BCLK signal edge at time 430, the master unit state machine advances to state CN and the system board main state machine advances to state B. The master unit state machine proceeds to state CN because the EX32* signal is low, indicating a matched extended cycle being performed. At time 430, the system board lowers the BALE signal and the CMD* signal.

At time 432, the master unit asserts the next address onto the LA<31-2> lines and the next M-IO state onto the M-IO line because the EXRDY line is high, indicating no wait states to be added, the cycle thus completing in normal timing. This is the address pipeline for the next cycle.

Proceeding to time 434, the master unit state machine proceeds to state ST and the system board state machine proceeds to state A. The master unit stores the da&a from the D<31-0> lines, lowers the START* signal and sets the BE*<3-0> and W-R signals as desired. The system board raises the CMD* signal.

This has been an explanation of several cycles of operation of the state machines. Further examples can be developed from the various state machines in combination with the timing diagrams.

The foregoing disclosure and description of the invention are illustrative and explanatory thereof, and various changes in the size, shape, materials, components, circuit elements, wiring connections and contacts, as well as in the details of the illustrated circuitry, construction and method of operation may be made without departing from the spirit of the invention.

I claim:

1. A system for transferring information of first and second different widths between a master unit of a first information width which provides a first set of address values and a first set of address control signals for use with the first information width and responds to a first delay signal to hold providing certain of said first set of address control signals and a responding unit of the first information width using the first set of address control signals and a responding unit of a second information width using a second set of address control signals, a responding unit of the first information width providing a first information width first address control signal address response signal as a part of the first address control signal set when addressed using the first set of address control signals to indicate a response will be received from the first information width first address control signal responding unit and a responding unit of the second information width using the second set of address control signals and not providing the first information width first address control signal address response signal, the system comprising:

an information path for coupling to the master unit and a responding unit using the first address control signal set;

an information path for coupling to the master unit and a responding unit using the second address control signal set;

an address value path for coupling to the master unit and responding units using the first and second address control signal sets;

a first address control signal path for coupling to the master unit and a responding unit using the first address control signals;

means coupled to said first address control signal path for determining whether a response will be received from a first information width responding unit which utilizes said first set of address control signals by monitoring the state of the first information width first address control signal address response signal;

a second address control signal path for coupling to the master unit and a responding unit using the second address control signals;

means coupled to said first and second address control signal paths for providing the second set of address control signals for use with responding units of other than the first information width in response to said first address control signal set response determining means determining that a response will not be received from a responding unit of the first information width utilizing said first set of address control signals; and means coupled to said first and second width information paths and said second address control signal set providing means for routing and storing information for transfer between said first width information path and said second information path when said second address control signals are being provided by said second address control signal set providing means, wherein said second address control signal set providing means further provides the first information width first address control signal address response signal on said first address control signal path indicating that a response of the first information width will be received utilizing said first set of address control signals after said information has been routed and stored by said information routing and storing means.

2. The system of claim 1, further comprising:
means coupled to said first and second address control signal paths, said address value path and said second address control signal set providing means for providing at least one of said first set of address control signals when said second set of address control signals are being provided by said second address control signal set providing means.

3. The system of claim 2, further comprising:
means coupled to said address value path and said at least one of said first set address control signal providing means for providing certain address values to said address value path when said at least one of said first set of address control signals is being provided.

4. The system of claim 1, further comprising:
means coupled to said address value path, said second address control signal path and said second address control signal set providing means for providing certain address values to said address value path when said second set of address control signals are being provided by said second address control signal set providing means.

5. The system of claim 1, wherein said information routing and storing means includes means for storing information provided by the master unit over said first address control signal information path during a write operation and for providing said stored information to the responding unit over said second address control signal information path according to said second set of address control signals.

6. The system of claim 5, wherein said information routing and storing means further includes means for storing information provided by the responding unit over said second address control signal information path according to said second set of address control signals and providing said stored information to the master unit over said first address control signal information path during a read operation.

7. The system of claim 1, wherein there may be responding units of the second information width using the first set of address control signals, responding units of a third information width using the first set of address control signals and responding units of the third information width using the second set of address control signals, a second information width first address control signal set responding unit providing a second information width first address control signal address response as one of the first set of address control signals to indicate a response will be received from the second information width first address control signal set responding unit using the first set of address control signals, a second information width second address control signal set responding unit providing a second information width second address control signal address response signal as one of the second set of address controls signals when addressed using the second set of address control signals to indicate a response will be received from the second information width second address control set responding unit, a third information width responding unit not providing an address response signal;
wherein said second address control signal set providing means further provides at least one of said first set of address control signals when said second address control signals are being provided; and
wherein said information routing and storing means routes and stores information for transfer between said first and second information path when responding units using said second address control signals are responding and routes and stores information from said first information path for transfer to said first information path when responding units using said first address control signals are responding.

8. The system of claim 7, wherein said second address control signal set providing means repeats providing of the second address control signals and said at least one first address control signal until information of the first information width has been transferred between the master unit and the responding unit.

9. The system of claim 8, wherein said second address control signal set providing means is responsive to a delay signal produced by a responding unit to extend the time sequence of said second set of address control signals.

10. The system of claim 8, wherein said second address control signal set providing means is responsive to a shorten signal produced by a responding unit to shorten the time sequence of said second set of address control signals.

11. The system of claim 8, wherein said second address control signals set providing means is coupled to said address value path and includes means for changing said address values for each repetition of said second address control signals.

12. A system for transferring information between a master unit of a given information width which provides a set of address values and a set of address control signals and responds to a delay signal to hold providing certain of said first set of address control signals and to signals indicating a response by a responding unit of equal or greater information width to complete the transfer cycle and a responding unit having an information width greater than or equal to said master unit given information width and a responding unit having an information width less than said master unit given information width, a responding unit of the greater than or equal information width providing a greater than address response signal or an equal address response signal when addressed using the address control signals to indicate a response will be received from a greater than or equal information width responding unit and a responding unit of the lesser information width not providing the greater than or equal address response signals when addressed using the address control signals, the system comprising:
an information path for coupling to the master unit and responding units;
an address value path for coupling to the master unit and responding units;
an address control signal path for coupling to the master unit and responding units;
means coupled to said address control path for determining whether a response will be received from a responding unit having an information width less than said master unit given information width by monitoring the state of the greater than and equal address response signals;
means coupled to said address control signal path, said address value path and said response determining means for providing at least one address control signal and certain address values in response to said address control signal response determining means determining that a response will be received from a responding unit having a lesser information width; and means coupled to said information path and said at least one address control signal providing means for routing and storing information for transfer between the master unit and the responding unit when a responding unit having a lesser information width is responding;

wherein said at least one address control signal providing means further provides a greater than address response signal or an equal address response signal to the master unit only after said information has been routed and stored by said information routing and storing means for responses by lesser information width responding units.

13. The system of claim 12, wherein said at least one address control signal providing means is responsive to said delay signal prior to providing said greater than or equal address response signals to hold providing said at least one address control signals and said certain address values if a responding unit of lesser information width is responding and wherein the master unit responds to the delay signal if the delay signal is present after providing of a greater than address response signal or an equal address response signal.

14. A master unit of a given information width for use in a system capable of transferring information between the master unit and a responding unit, first responding units having an information width equal to the master unit given information width and providing an equal address response signal when responding and second responding units having an information width less than the master unit given information width not providing the equal address response signal, the responding units providing a delay signal when a holding of address value and address control signals is desired, the system having:
an information path for coupling to the master unit and responding units,
an address value path for coupling to the master unit and responding units;
an address control signal path for coupling to the master unit and responding units;
means coupled to the address control signal path for determining whether a response will be received from a responding unit having an information width less than the master unit given information width by monitoring the state of the equal address response signal;
means coupled to the address control signal path, the address value path and the response determining means for providing at least one address control signal and certain address values in response to the address control signal response determining means determining that a response will be received from a lesser information width responding unit; and
means coupled to the information path and the at least one address control signal providing means for routing and storing information for transfer between the master unit and the responding unit when a responding unit having a lesser information width is responding, the at least one address control signal providing means further providing the equal address response signal only after the information has been routed and stored by the information routing and storing means, the master unit comprising:
means for coupling to the address value path for providing address values;
means for coupling to the address control signal path for providing address control signals;
means for receiving the equal address response signal;
means for receiving the delay signal; and
means coupled to said master unit address value providing means, said master unit address control signal providing means, said master unit address response signal receiving means and said delay signal receiving means for holding the providing of address values and address response signals by said master unit in response to the delay signal if the equal address response signal is receiving prior to a predetermined time in the time sequence of the address control signals and for not holding the providing of certain address values and address control signals by said master unit in response to the delay signal if the equal address response signal is received after said predetermined time.

15. A computer system for use with master unit circuit boards of a first information width, a master unit circuit board providing a first set of address values and a first set of address control signals for use by first address control signal responding units and responsive to a first delay signal to hold providing certain of said first set of address control signals, and responding circuit boards using a first set of address control signals and a second set of address control signals, a responding circuit board of the first information width providing a first address response signal when addressed using the first set of address control signals to indicate a response will be received from the first information width first address control signal responding unit, the computer system comprising:

a system board including:
address control, address value and information routing and storing circuitry; and
a plurality of connector sets for receiving the circuit boards, each of said connector sets including lines for coupling to said master unit and responding unit circuit boards and coupled to said system board address control, address value and information routing and storing circuitry for transferring information according to said first address control signals and to said second address control signals and for transferring address values and address control signals;

wherein said address control, address value and information routing and storing circuitry includes:
means for determining whether a response will be received from a responding circuit board having a first information width which utilizes said first set of address control signals by monitoring the state of the first address response signal;
means for providing a second set of address control signals to said address control signal lines for use with responding circuit boards using the second set of address control signals in response to said first address control signal set response determining means determining that a response will not be received from a responding circuit board having the first information width and utilizing said first set of address control signals, and means for routing and storing information for transfer between said first address control information lines and said second address control information lines, wherein said second address control set providing means further provides the first address response signal after said information has been routed and stored by said information routing and storing means.

16. The computer system of claim 15, wherein the system board address control, address value and information routing and storing circuitry further includes:
means for providing at least one of said first set of address control signals when said second set of address control signals are being provided by said address control signal set providing means.

17. The computer system of claim 16, wherein the system board address control, address value and information routing and storing circuitry further includes:
means for providing certain address values to said address value path when said at least one of said first set of address control signals is being provided.

18. The computer system of claim 15, wherein the system board address control, address value and information routing and storing circuitry further includes:
means for providing certain address values to said address value path when said at least one of said first set of address control signals is being provided.

19. The computer system of claim 15, wherein said information routing and storing means includes:
means for storing information provided by the master unit over said first address control information lines during a write operation and for providing said stored information to the responding unit over said second address control information lines according to said second set of address control signals.

20. The computer system of claim 19, wherein said information routing and storing means further includes means for storing information provided by the responding unit over said second address control information lines according to said second set of address and information control signals and for providing said stored information to the master unit over said first address control information lines during a read operation.

21. The computer system of claim 15, wherein there may be responding units of a second information width using the first set of address control signals, responding units of a third information width using the first set of address control signals and responding units of the third information width using the second set of address control signals, a second information width first address control signal set responding unit providing a second address response as one of the first set of address control signals to indicate a response will be received from the second information width first address control signal set responding unit using the first set of address control signals, a second information width second address control signal set responding unit providing a third address response signal as one of the second set of address control signals when addressed using the second set of address control signals to indicate a response will be received from the second information width second address control set responding unit, a third information width responding unit not providing an address response signal;

wherein said second address control signal set providing means further provides at least one of said first set of address control signals when said second address control signals are being provided; and wherein said information routing and storing means routes and stores information for transfer between said first and second information path when responding units using said second address control signals are responding and routes and stores information from said first information path for transfer to said first information path when responding units using said first address control signals are responding.

22. The computer system of claim 21, wherein said second address control signal set providing means repeats providing of the second address control signals and said at least one first address control signal until information of the first information width has been transferred between the master unit and the responding unit.

23. The computer system of claim 22 wherein said second address control signal set providing means is responsive to a delay signal produced by a responding unit to extend the time sequence of said second set of address control signals.

24. The computer system of claim 22, wherein said second address control signal set providing means is responsive to a shorten signal produced by a responding unit to shorten the time sequence of said second set of address control signals.

25. The computer system of claim 22, wherein said second address control signal set providing means includes means for changing said values for each repetition of said second address control signals.

26. A computer system for use with master unit circuit boards of a given information width which provide a set of address value and a set of address control signals and respond to a delay signal to hold providing certain of said first set of address control signals and signals indicating a response by a responding unit circuit board of equal or greater information width to complete the transfer cycle and responding unit circuit boards having an information width greater than or equal said master unit circuit board given information width less than said master unit circuit board given information width, a responding unit circuit board of the greater than or equal information width providing a greater than address response signal or an equal address response signal when addressed using the address control signals to indicate a response will be received from the greater than or equal information width responding unit circuit board and a responding unit circuit board of the lesser information width and not providing the greater than or equal address response signals when addressed using the address control signals, the computer system comprising:

a system board including:
address control, address value and information routing and storing circuitry; and
a plurality of connector sets for receiving the circuit boards, each of said connector sets including lines for coupling to said master unit and said responding unit circuit boards and coupled to said system board address control, address value and information routing and storing circuitry for transferring information according to the address control signals and for transferring address values and address control signals;

wherein said address control, address value and information routing and storing circuitry includes:
means for determining whether a response will be received from a responding unit circuit board having an information width less than said master unit given information width by monitoring the state of the greater than or equal address response signals;

means for providing at least one address control signal and certain address values to said address control signal and address value lines in response to said address control signal response determining means determining that a response will be received from a responding unit circuit board having a lesser information width; and means for routing and storing information for transfer over said information lines between the master unit circuit board and the responding unit circuit board when a responding unit circuit board having a lesser information width is responding;

wherein said at least one address control signal providing means further provides a greater than address response signal or an equal address response signal to the master unit circuit board only after said information has been routed and stored by said information routing and storing means for responses by lesser information width responding unit circuit boards.

27. The computer system of claim 26, wherein said at least one address control signal providing means is responsive to said delay signal prior to providing said greater than or equal address response signals to hold providing said at least one address control signals and said certain address values if a responding unit circuit board of lesser information width is responding and wherein the master unit circuit board responds to the delay signal if the delay signal is present after providing of a greater than address response signal or an equal address response signal.

* * * * *

UNITED STATES PATENT AND TRADEMARK OFFICE
CERTIFICATE OF CORRECTION

PATENT NO. : 5,165,037
DATED : November 17, 1992
INVENTOR(S) : Paul R. Culley

It is certified that error appears in the above-identified patent and that said Letters Patent is hereby corrected as shown below:

In Col. 40, Line 33, please replace "value" with --values--.

In Col. 40, Line 40, after "width" please insert --and responding unit circuit boards having an information width--.

Signed and Sealed this

Nineteenth Day of October, 1993

Attest:

BRUCE LEHMAN

Attesting Officer   Commissioner of Patents and Trademarks